United States Patent
Wang et al.

(10) Patent No.: US 9,464,837 B2
(45) Date of Patent: Oct. 11, 2016

(54) PHASE CHANGE MATERIAL EVAPORATOR CHARGING CONTROL

(71) Applicant: MAHLE International GmbH, Stuttgart, MI (US)

(72) Inventors: Mingyu Wang, Amherst, NY (US); Prasad S. Kadle, Williamsville, NY (US); Edward Wolfe, IV, Clarence Center, NY (US)

(73) Assignee: MAHLE International GmbH, Stuttgart (DE)

( * ) Notice: Subject to any disclaimer, the term of this patent is extended or adjusted under 35 U.S.C. 154(b) by 297 days.

(21) Appl. No.: 13/930,322

(22) Filed: Jun. 28, 2013

(65) Prior Publication Data
US 2013/0283827 A1 Oct. 31, 2013

Related U.S. Application Data

(63) Continuation-in-part of application No. 13/451,665, filed on Apr. 20, 2012.

(51) Int. Cl.
| | |
|---|---|
| F25D 11/00 | (2006.01) |
| F25B 49/02 | (2006.01) |
| B60H 1/00 | (2006.01) |
| F25B 39/02 | (2006.01) |

(Continued)

(52) U.S. Cl.
CPC ............ *F25B 49/022* (2013.01); *B60H 1/005* (2013.01); *B60H 1/00828* (2013.01); *F25B 39/022* (2013.01); *F28D 1/0341* (2013.01); *F28D 20/02* (2013.01); *F28F 21/08* (2013.01); *F25B 2400/24* (2013.01); *F28D 2020/0013* (2013.01); *F28D 2021/0085* (2013.01); *Y02E 60/145* (2013.01)

(58) Field of Classification Search
CPC ....... F25B 49/022; F25B 39/02; F28F 21/08; F28D 1/0341
USPC ...... 62/56.61, 115, 239, 244, 407, 434, 498, 62/510, 515, 524; 165/151, 287
See application file for complete search history.

(56) References Cited

U.S. PATENT DOCUMENTS 3,976,458 A * 8/1976 Krug ................................ 62/175
4,964,279 A 10/1990 Osborne
(Continued)

FOREIGN PATENT DOCUMENTS

| DE | 10317521 A1 | 10/2003 |
|---|---|---|
| WO | 2004/035335 A1 | 4/2004 |

OTHER PUBLICATIONS

EP Search Report Dated Jan. 23, 2015.

*Primary Examiner* — Melvin Jones
(74) *Attorney, Agent, or Firm* — Brinks Gilson & Lione

(57) ABSTRACT

A method of controlling an air conditioning compressor in a heating ventilation and air conditioning system having a evaporator including a phase change material is presented. The method includes the steps of measuring an evaporator output air temperature, determining a state of charge value by calculating a difference between an estimated refrigerant temperature based on the evaporator output air temperature and a phase change material freeze temperature and integrating this difference over time and operating the air conditioning compressor to maintain the state of charge value between an upper and lower limit. A method of recovering braking energy in a vehicle containing a heating ventilation and air conditioning system having the evaporator including the phase change material is also presented.

19 Claims, 14 Drawing Sheets

(51) Int. Cl.
*F28F 21/08* (2006.01)
*F28D 1/03* (2006.01)
*F28D 20/02* (2006.01)
*F28D 21/00* (2006.01)
*F28D 20/00* (2006.01)

(56) References Cited

U.S. PATENT DOCUMENTS

| | | |
|---|---|---|
| 5,277,038 A | 1/1994 | Carr |
| 5,553,662 A | 9/1996 | Longardner et al. |
| 5,579,830 A | 12/1996 | Giammaruti |
| 6,357,242 B1* | 3/2002 | Farley et al. .......... 62/133 |
| 6,397,618 B1 | 6/2002 | Chu et al. |
| 6,408,633 B1 | 6/2002 | Carr |
| 6,973,799 B2 | 12/2005 | Keuhl et al. |
| 7,043,931 B2 | 5/2006 | Plummer |
| 7,134,483 B2 | 11/2006 | Barnwell |
| 7,156,156 B2 | 1/2007 | Haller et al. |
| 2003/0192952 A1* | 10/2003 | Horn et al. .......... 236/10 |
| 2004/0003607 A1* | 1/2004 | Kadle et al. .......... 62/158 |
| 2005/0087333 A1* | 4/2005 | Horn et al. .......... 165/203 |
| 2009/0266094 A1 | 10/2009 | Major et al. |
| 2010/0242510 A1* | 9/2010 | Kadle et al. .......... 62/127 |
| 2011/0067419 A1 | 3/2011 | Aoyagi |

* cited by examiner

PHASE CHANGE MATERIAL EVAPORATOR CHARGING CONTROL

CROSS-REFERENCE TO RELATED APPLICATION

This application is a continuation-in-part application and claims the benefit under 35 U.S.C. §120 of U.S. patent application Ser. No. 13/451,665 filed 20 Apr. 2012 by G. Vreeland et al. entitled "Evaporator Phase Change Thermal Siphon" and U.S. application Ser. No. 13/845,695 filed 18 Mar. 2013 by M. Wang et al. entitled "Phase Change Materials Evaporator Charging Control" which claimed benefit of U.S. Provisional Patent Application No. 61/613,684 filed 21 Mar. 2012. The entire disclosure of each aforesaid related application is hereby incorporated herein by reference.

TECHNICAL FIELD OF THE INVENTION

The present invention relates to an evaporator for a vehicle air conditioning system; more particularly, to an evaporator having a phase change material (PCM), and still more particularly, to the control of the charging of the phase change material.

BACKGROUND OF THE INVENTION

Hybrid electric vehicles may employ belt alternator starter (BAS) technology to gain fuel efficiency of the internal combustion engine. Coming to a stop at a traffic light or during an extended idle, the engine is turned off to save fuel. As the brake pedal is released, an electric motor/generator unit restarts the engine, typically in a time of less than half of a second, making the auto start system essentially transparent to the driver. This is referred to as a stop-start strategy for enhancing fuel economy. A BAS equipped vehicle can provide 15 to 20% fuel economy gain in city driving and an overall fuel economy increase of 4 to 7%. For a baseline gasoline vehicle with fuel economy of 12.75 kilometers per liter (km/l) of gasoline (30 miles per gallon (MPG)), this is equivalent to an increase of 0.5 to 0.9 km/l (1.2 to 2.1 MPG) in fuel economy.

While the stop-start operation improves fuel economy, it may compromise passenger thermal comfort. Stopping the engine disables the belt-driven air conditioning (A/C) compressor, resulting in interruption of cooling for the passenger compartment. Typically, vehicle manufactures rely on the thermal inertia of the air conditioning evaporator to provide some residual cooling during the period when the engine is stopped. The evaporator residual cooling time is typically limited to 25 seconds or less before the discharge temperature of the evaporator rises above a level that no longer provides the desired cooling. When the evaporator is warmed up to a specified air discharge temperature, the engine is restarted to drive the A/C compressor to provide cooling. This periodic restarting of the engine under idle conditions undermines fuel economy improvement that can be achieved by the hybrid electric vehicles.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF SUMMARY OF THE INVENTION

In accordance with one embodiment of this invention, a method of controlling an air conditioning compressor in a heating ventilation and air conditioning system having a thermosiphon evaporator including a phase change material is provided. The method includes the steps of measuring an evaporator output air temperature, determining a state of charge value based on the evaporator output air temperature, and determining an upper limit value and a lower limit value for the state of charge value. The method further includes the steps of initiating operation of the A/C compressor when the state of charge value is less than or equal to said lower limit value and discontinuing operation of the A/C compressor when the state of charge value is greater than or equal to said upper limit value.

The method may further include the step of operating the A/C compressor according to a series reheat reduction control method when the heating ventilation and air conditioning (HVAC) system is determined to be operating in a defog mode or when a humidity value within a vehicle cabin exceeds a threshold.

In another embodiment of the present invention, a method of recovering braking energy in a vehicle having a HVAC system having the thermosiphon evaporator including the phase change material is provided. The method includes the step of converting a portion of the vehicle's kinetic energy to mechanical energy, providing a portion of said mechanical energy to an A/C compressor, operating said A/C compressor to compress a refrigerant to a liquid state, and evaporating said refrigerant to a gaseous state within said thermosiphon evaporator, thereby changing a liquid state of the phase change material to a solid state and thereby storing energy from the A/C compressor.

The method may further include the steps of converting a portion of said mechanical energy to electrical energy and providing a portion of said electrical energy to an electrical motor driving said A/C compressor.

Further features and advantages of the invention will appear more clearly on a reading of the following detailed description of the preferred embodiment of the invention, which is given by way of non-limiting example only and with reference to the accompanying drawings.

BRIEF DESCRIPTION OF THE SEVERAL VIEWS OF THE DRAWING

The present invention will now be described, by way of example with reference to the accompanying drawings, in which.

DETAILED DESCRIPTION OF THE INVENTION

Figure 1:
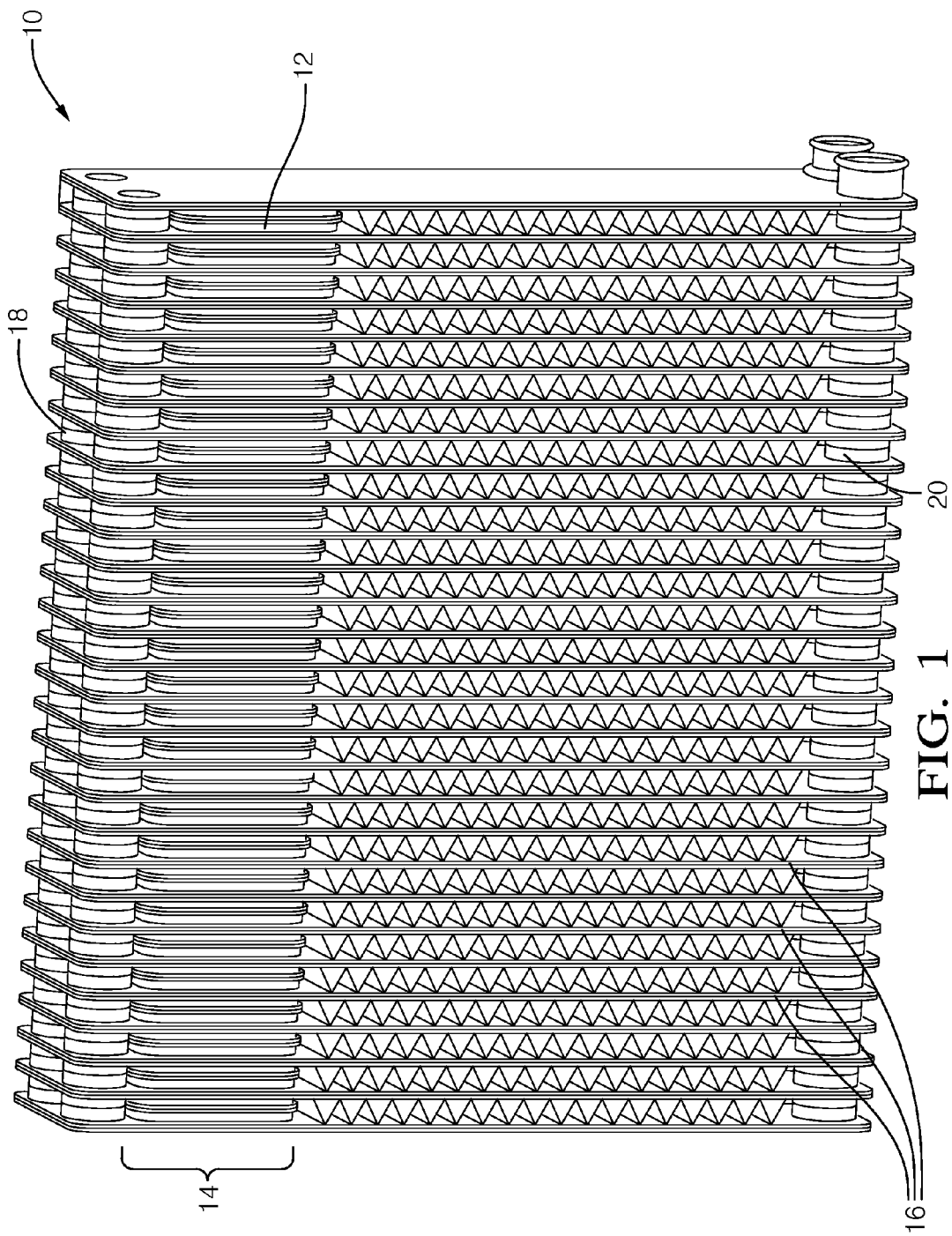
FIG. 1 illustrates a perspective view of a thermo siphon PCM evaporator in accordance with one embodiment.

To improve vehicle fuel economy, phase change material (PCM) based thermal storage systems have been created to store the excess cooling available during road load operations and release the stored cooling during traffic stop to provide passenger comfort. An example of such a PCM thermal storage system is described in U.S. Pat. No. 8,397,529 granted to Wolfe et al. on 19 Mar. 2013, the entire disclosure of which is hereby incorporated herein by reference. As indicated in FIG. 1, PCM is typically integrated into the top portion of the evaporator to provide cooling storage capability. However, the PCM may be located anywhere within the evaporator. Due to the fact that PCMs' latent heat is significantly greater than their sensible heat, an extended period of comfort can be provided to the passenger compartment before an engine restart is needed. The reduction in the frequency of restart, or the entire elimination thereof, during the majority of traffic stops, allows the stop-start strategy to achieve its full fuel economy potential.

Referring to FIG. 1, illustrated is a preferred exemplary embodiment of an evaporator 10 having a plurality of PCM housings 12 in thermal communication with the upper region 14 of the refrigerant tubes 16. The evaporator 10 includes an upper manifold 18 and a lower manifold 20, in which the terms upper and lower are used with respect to the direction of gravity. Hydraulically connecting the upper manifold 18 with the lower manifold 20 are flat refrigerant tubes 16 which may be manufactured by any methods known to those of ordinary skill in the art, such as by extrusion, folding of a sheet of heat conductive material, or assembling two half plates having stamped features defining flow spaces. While flat tubes are shown, those of ordinary skill in the art would recognize that other refrigerant tube shapes may be utilized.

Figure 2:
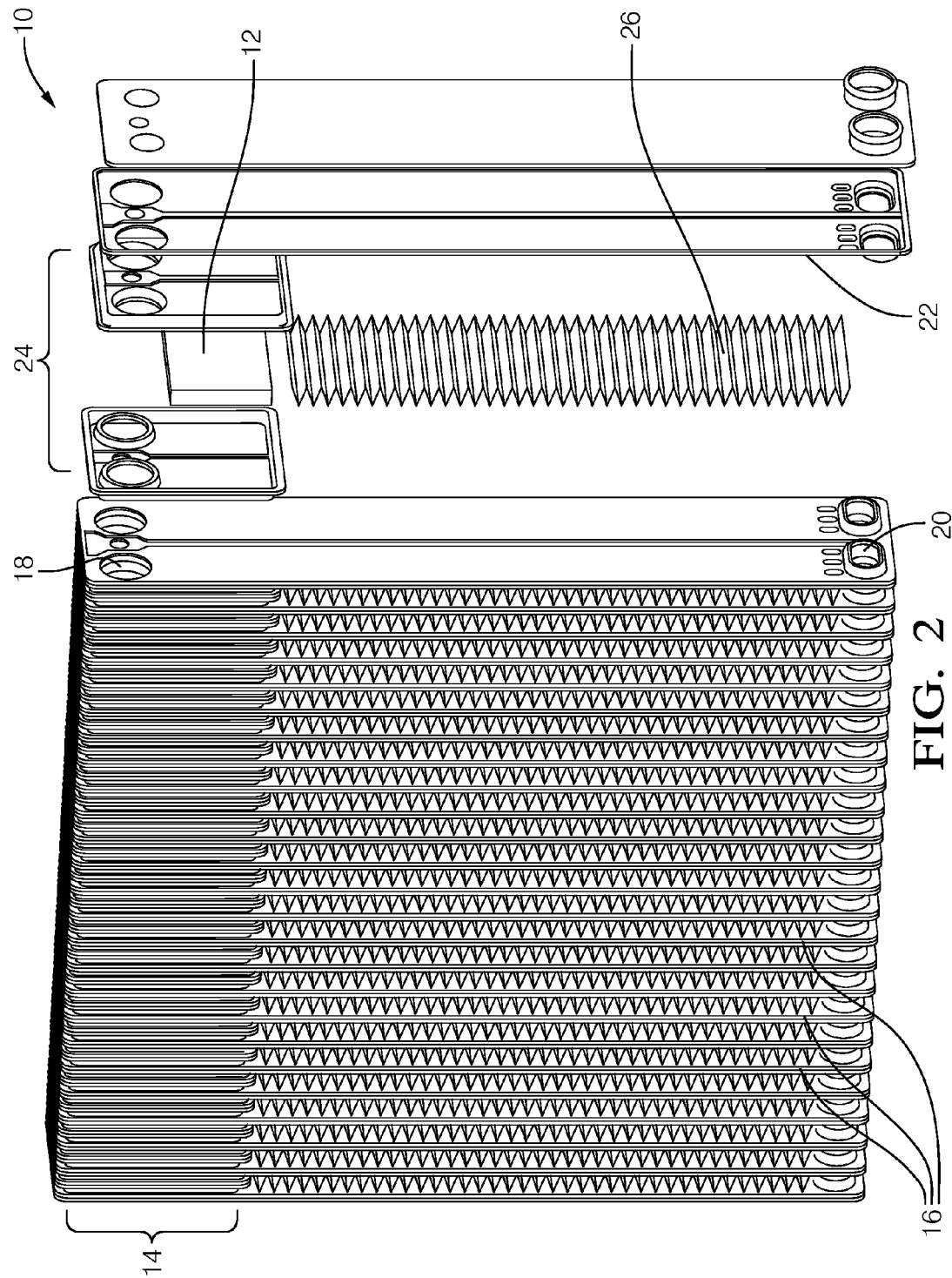
FIG. 2 illustrates an exploded, perspective view of the thermosiphon PCM evaporator of FIG. 1, depicting internal details thereof in accordance with one embodiment.

Referring to FIG. 2, illustrated is a partially exploded view of the evaporator 10, which is manufactured from a plurality of stamped metallic plates 22. The stamped metallic plates 22 include features known to those of ordinary skill in the art, such as openings, bosses about selected openings, and flanges. When stacked and brazed, the plurality of stamped metallic plates 22 define the upper manifold 18, lower manifold 20, and flat refrigerant tubes 16 hydraulically connecting the upper and lower manifolds 18, 20. Inserted between adjacent flat refrigerant tubes 16 is a PCM housing 24 containing a phase change material, e.g. a paraffin wax material. The PCM housing 24 may be defined by features on the stacked and brazed stamped metallic plates 22, or may be manufactured separately and then assembled onto the evaporator 10. A PCM housing 24 is disposed between adjacent flat refrigerant tubes 16 and is in thermal contact with only the upper region 14 of the flat refrigerant tubes 16. The PCM housing 24 may surround part of the upper manifold 18 or, as an alternative, the PCM housing 24 may be separate from the upper manifold 18 and positioned in the upper region 14 of the flat refrigerant tubes 16 immediately below the upper manifold 18. A heat conductive material such as metallic fins or metallic particles or fibers may be added in the PCM housing 24 to increase the heat transfer efficiency. Corrugated fins 26 may be inserted between the adjacent flat refrigerant tubes 16 beneath the PCM housing 24.

Figure 3:
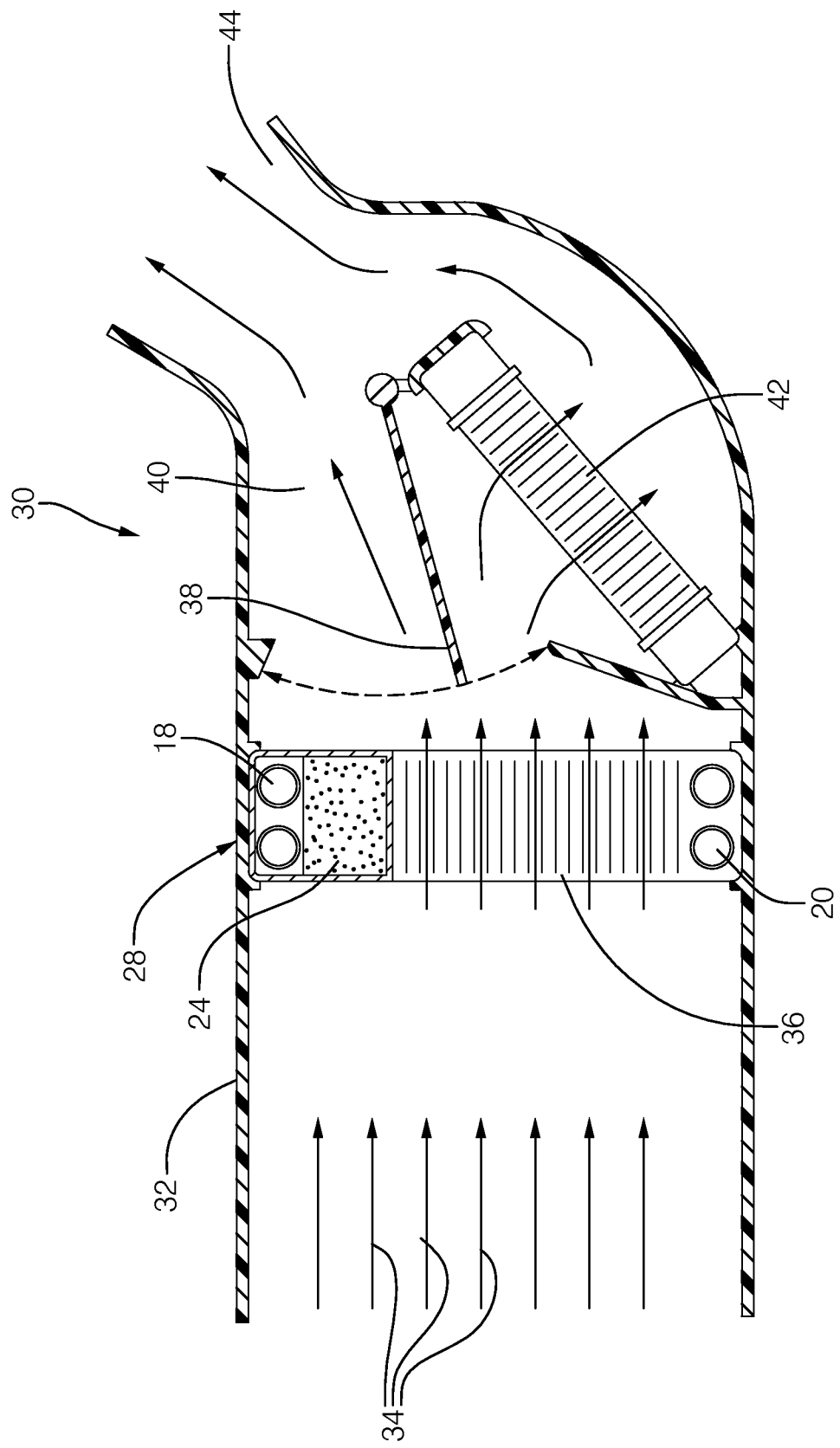
FIG. 3 illustrates the PCM evaporator of FIG. 1, employed within a HVAC module in accordance with one embodiment.

FIG. 3 indicates the application of a PCM evaporator 28 in a HVAC module 30. The PCM evaporator 28 replaces the traditional evaporators and becomes an integral part of the HVAC module 30. The PCM evaporator 28 is disposed within an HVAC air flow duct 32 such that air flowing therethrough, as indicated by arrows 34, passes through the lower portion 36 of the PCM evaporator 28. Airflow exiting the PCM evaporator 28 is selectively directed by a damper door 38 through a bypass passage 40 or a heater core 42 toward an outlet port 44.

Figure 4:
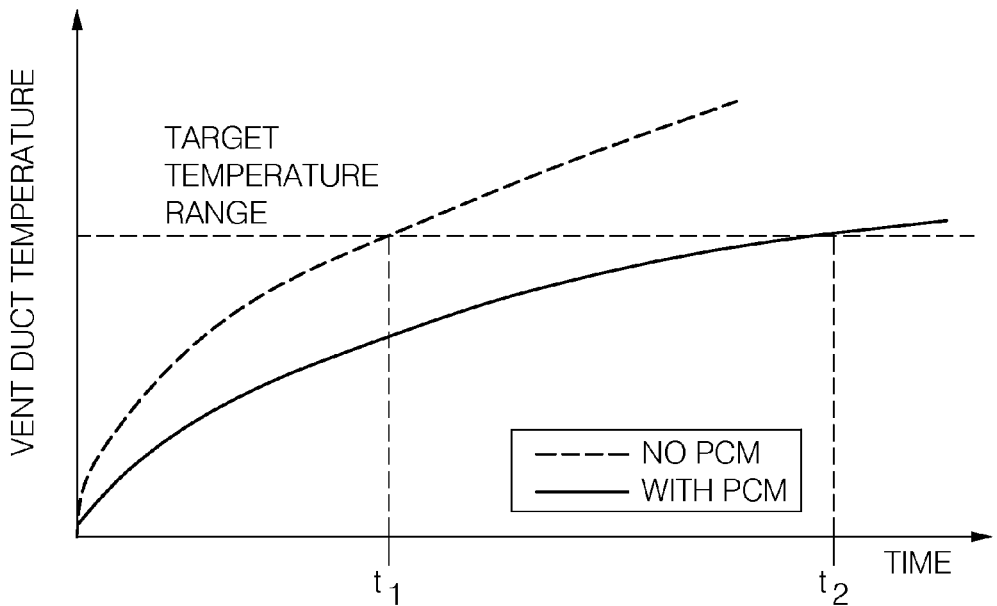
FIG. 4 is a graph illustrating contrasting vent duct temperature vs. time characteristics of an HVAC module with and without a PCM evaporator in accordance with one embodiment.

FIG. 4 graphically illustrates the impact of the PCM cooling storage in terms of the duration within which a sustained low vent outlet discharge temperature is achieved. Normally, the duration of useful discharge temperature is double or triple of the standard non-PCM equipped evaporators.

An embodiment of the invention focuses on the managed use of the PCM evaporator 28 to achieve maximum fuel economy saving. The direct application of the present invention is on vehicles with automatic climate control systems. However, it is also applicable to enhanced manually controlled HVAC systems.

The basis is the definition of a state of charge indicator. With the charging status known, it is possible to intelligently manage the charging process to increase the operational availability of the PCM cooling at a traffic stop and achieve improved fuel economy. Meanwhile, it also makes it possible to achieve operational compatibility with the series reheat reduction control methodology, allowing mild hybrid vehicles (i.e. vehicles using stop-start) to gain the benefit of energy saving from both the PCM and SRR.

State of Charge Indicator

Herein one method of defining the state of charge indicator is provided. According to Max Planck (1858-1947, Germany, Nobel Physics Prize Recipient, 1918), the liquid/solid phase change time for pure or homogeneous substances of specific shape with a single freezing/melting temperature can be determined with the following formula:

$$t_{100} = \frac{\Delta H_f \rho}{T_{Freeze} - T_\infty} \left( \frac{P_d}{h} + \frac{Rd^2}{k} \right)$$

where $t_{100}$ Time to achieve 100% phase change (in minutes)
$\Delta H_f$ Latent heat of fusion
$\rho$ Density, use liquid density for freezing and solid density for melting
$T_{Freeze}$ Freezing temperature of the phase change material
$T_\infty$ Surrounding medium temperature
d Characteristic length: thickness (slab) or diameter (cylinder or sphere)
h Surrounding medium heat transfer coefficient
k Material thermal conductivity: use solid thermal conductivity for freezing and liquid thermal conductivity for melting
P, R Shape dependent constants, as given in Table 1

TABLE 1

Shape Dependent Constants for Plank's Equation

| Shape | P | R |
|---|---|---|
| Infinite Slab | 0.5 | 0.125 |
| Infinite Cylinder | 0.25 | 0.0625 |
| Sphere | 0.167 | 0.04167 |

In the PCM evaporator environment, the melting or freezing driving temperature is provided by the HVAC system refrigerant. Normally there is no direct evaporator refrigerant temperature measurement in the vehicle. Thus the refrigerant temperature may be obtained indirectly. In most vehicles, the evaporator output air temperature (EOAT) is measured with a thermistor for HVAC system control purposes. The EOAT temperature may be used to approximate the refrigerant temperature through the following equation, where C is a constant that is calibrated to account for the difference between the refrigerant temperature and the EOAT temperature. It is expected that improvement to the above formula may be obtained by those skilled in the art by way of heat transfer and thermodynamic principles.

$$T_\infty = T_{refrig} = T_{eoa} - C$$

During the freeze process, assuming the PCM is subjected to the refrigerant temperature $T_{refrig}$ for an incremental amount of time $\delta t$, the percentage of PCM frozen (or charged) can be indicated by $\delta f_p$)

$$\delta f_p = \frac{\delta t}{t_{100}} = \frac{\delta t}{\frac{\Delta H_f \rho}{[T_{Freeze} - T_{eoa}(t) - C]} \left( \frac{P_d}{h} + \frac{Rd^2}{k} \right)}$$

Integrating $\delta f_p$ over the time during which the PCM is exposed to the refrigerant temperature, the total percentage of PCM frozen, or the state of charge indicator, can be obtained, $$f_p = \int_0^t \frac{dt}{\frac{\Delta H_f \rho}{[T_{Freeze} - T_{eoa}(t) - C]} \left( \frac{P_d}{h} + \frac{Rd^2}{k} \right)}$$

Since most of the terms in the above equation are constants, and by defining the following constant K, $$K = \frac{1}{\Delta H_f \rho \left( \frac{P_d}{h} + \frac{Rd^2}{k} \right)}$$

the percentage frozen function can be given as below and used as the state of charge indicator, $$f_p = K \int_0^t [T_{Freeze} - T_{eoa}(t) - C] dt$$

The following general boundary conditions apply during the integration process,

If $f_p > 1, f_p = 1$

If $f_p < 0, f_p = 0$

At engine start before a trip begins or at each traffic stop that lasts longer than the maximum capable time of the PCM evaporator 28, the percentage froze function is initialized to zero, $f_p = 0$ PCM Evaporator Initial Charging During Transient Soak and Cool Down The HVAC system operation may be classified into two phases of operation. When the cabin is soaked to a high in-vehicle temperature before the engine is started, the initial air conditioning objective is to bring the in-vehicle temperature down as quickly as possible to achieve passenger comfort. This is normally classified as the transient HVAC control. After the in-vehicle temperature has been brought down to a preset comfort temperature, further HVAC system operation is regulated to maintain the in-vehicle comfort. This maintenance phase of the HVAC system control is classified as the steady state control phase.

During the transient stage of the soak and cool down, no charging can be obtained when the EOAT is considerably above the PCM freeze temperature. Charging will start when:

$T_{eoa}(t) - C < T_{Freeze}$ the state of charge can be tracked by real-time integrated $f_p$.

At certain point of the transient operation, the PCM charging may be accelerated by overriding the blower to a lower voltage such that the refrigerant temperature falls below $T_{Freeze}$, or $T_{eoa}(t) - C << T_{Freeze}$ The blower voltage override to a lower value helps promote earlier or quicker charging of the PCM evaporator 28. However, if the priority is for accelerated transient in-vehicle comfort, charging of the PCM evaporator 28 can be delayed or avoided by overriding blower voltage to a higher level than the default setting. At the higher air flow rate, the refrigerant temperature will be elevated along with the EOAT temperature, such that $$T_{eoa}(t)-C>T_{Freeze}$$

When this condition is met with control, it ensures that no charging of PCM will occur and the highest amount of cooling enthalpy will be delivered to the passenger compartment.

Figure 5:
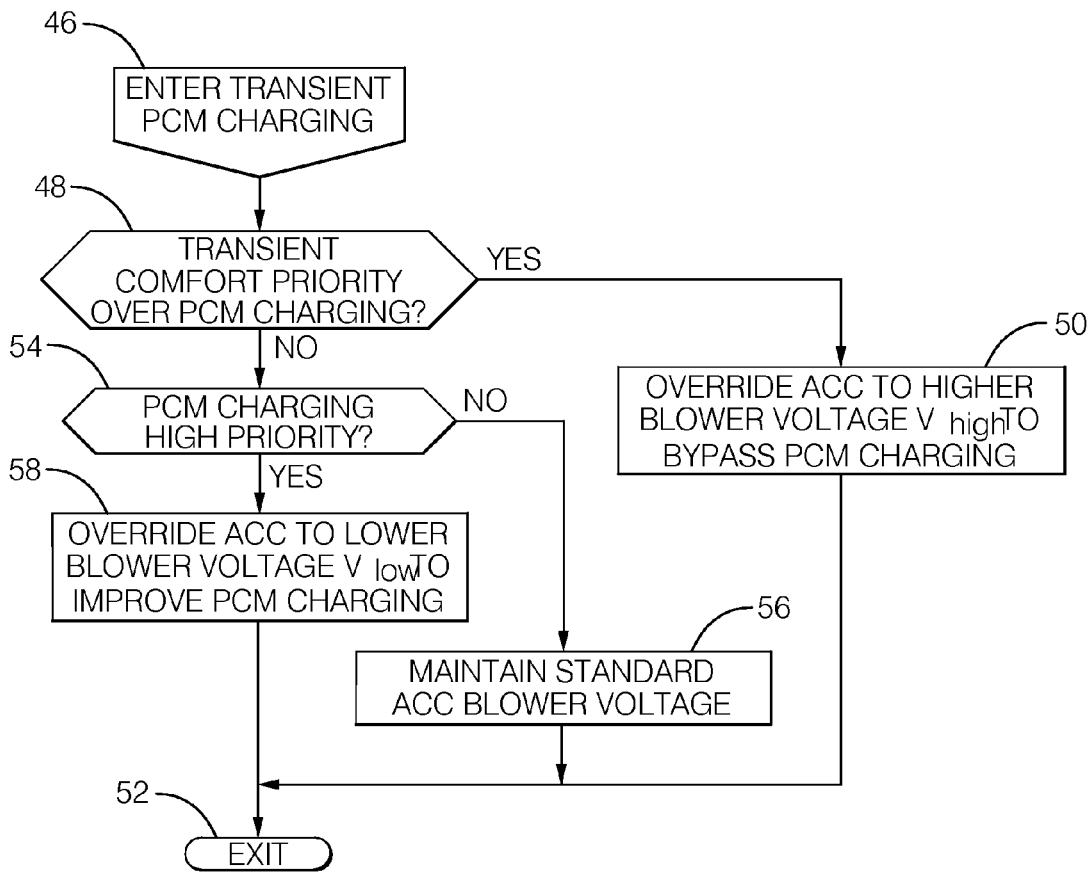
FIG. 5 illustrates a flow chart for managing the PCM charging during A/C transient operation in accordance with one embodiment.

FIG. 5 provides the flowchart for managing the PCM evaporator charging during the transient phase of the HVAC system operation. The flowchart commences with entering transient PCM charging at step 46, which flows to logic step 48. If the transient comfort has priority over PCM charging, flow passes to step 50 providing override to higher blower voltage Vhigh to bypass PCM charging, and passes on to exit step 52. If the transient comfort does not have priority over PCM charging, flow passes to logic step 54. If PCM charging does not have high priority, flow passes to step 56, where the normal Automatic Climate Control (ACC) system prevails, and passes on to exit step 52. If PCM charging has high priority, it flows to the step 58 of overriding ACC to lower blower voltage Vlow to improve PCM charging, and passes to exit step 52.

PCM Evaporator Charging Under Steady State Conditions

For systems without SRR, and under low to mid ambient temperatures, the refrigerant temperature may be naturally below the freezing temperature of PCM, and meeting the condition of, $$T_{eoa}(t)<T_{Freeze}+C$$

then charging will automatically occur. The state of charge is tracked with $f_p$. Once charged, the PCM evaporator 28 will remain charged and ready to be discharged at traffic stop.

However, if under steady state operating conditions, the refrigerant temperature is above the freeze temperature of PCM, such as when the vehicle is operating in relatively high ambient temperatures (>30° C., e.g.), charging of PCM, if desired, can be accomplished by reducing the blower voltage below that commanded by the ACC system. Under the reduced blower voltage, lower refrigerant temperature may be obtained and hopefully below the PCM freeze temperature. The in-vehicle comfort will be compromised only to a limited extent, since at the reduced airflow rate the outlet discharge temperature will also be lowered. For such relatively high ambient temperatures, the override state may need to be maintained over time to ensure the readiness of the PCM evaporator for discharging.

One alternative is to allow certain amount of discharge to the PCM during steady state operation. For example, a minimum state of charge of the PCM is maintained at 75%. Whenever the state of charge reaches 100%, as indicated by $f_p$, the override state is terminated and the ACC system may return to normal operation. Discharge of PCM will occur under the normal operating condition. Once the threshold condition of 75% is reached, charging may be resumed by overriding the blower again.

Under even higher ambient temperature conditions (e.g. >=40° C.), the PCM charging temperature may be difficult to reach under the minimum allowable blower voltage. Under these conditions, the engine should not be turned off at the traffic stop for fuel saving purposes. Instead, the engine should remain on for comfort maintenance.

Figure 6:
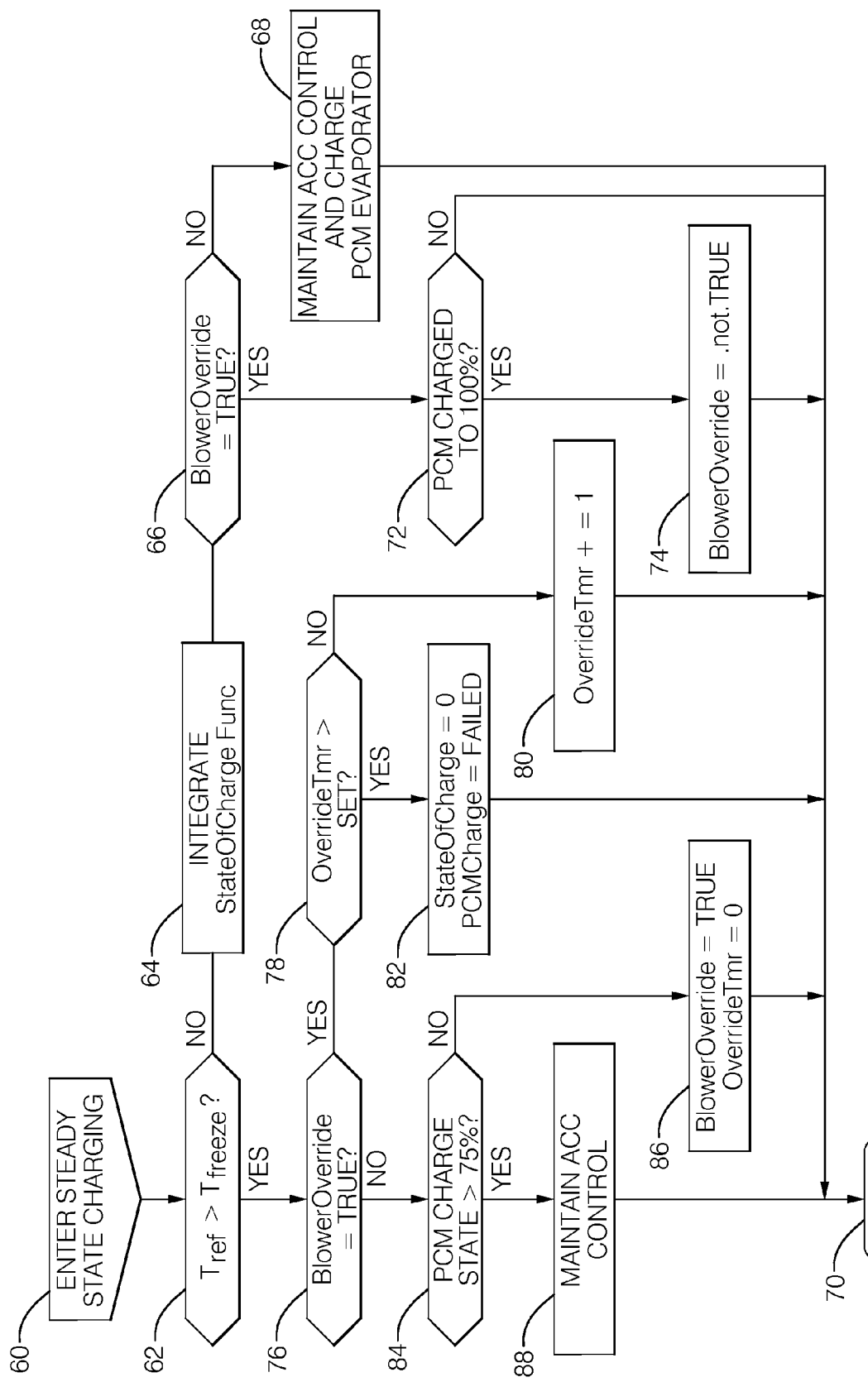
FIG. 6 illustrates a flow chart of a method for monitoring and managing the steady state charging of the PCM evaporator of FIG. 1 in accordance with one embodiment.

FIG. 6 shows the flowchart for monitoring and managing the steady state charging of the PCM evaporator. During steady state HVAC system operation where cabin comfort has been achieved, natural charging is maintained. The rest of the branch manages the cyclic charging of the PCM evaporator by blower override. In the event charging fails to occur after certain amount of time with the blower overridden, a failure to charge signal is provided to engine control to prevent engine from stopping during traffic stop.

The flowchart of FIG. 6 commences with entering steady state charging at step 60, and flows to a logic step 62 determining if Tref exceeds Tfreeze. If Tref does not exceed Tfreeze, the state of charge function is integrated at step 64 and then flows to logic step 66. In logic step 66, if Blower Override is not true, the ACC control is maintained and PCM evaporator is charged at step 68, and then flows to exit step 70. Alternatively, if Blower Override is true, PCM charge state is determined at logic step 72. If the PCM is not charged to 100%, flow is direct to exit step 70 with no action taken. If the PCM is charged to 100%, flow is to step 72 and 74 wherein the Blower Override flag is set to not true and then to exit step 70. This disables the blower override. If Tref exceeds Tfreeze, flow is to a logic step 76 where Blower Override state is evaluated. If Blower-Override is true, logic flow is to logic step 78 which determines if Override Tmr has reached a calibrated set value. If Override Tmr has not reached the set value, Override Tmr+ is incremented by 1 at step 80 and logic flows to exit step 70. If Override Tmr has reached the set value, the state of charge is assigned 0 and the PCM Charge is assigned to Failed at step 82 and logic flows to exit step 70. If Blower Override is not true, logic flow is to a logic step 84 wherein if PCM Charge does not exceed 75%, logic flow is to step 86 setting Blower Override=True and Override Tmr=0 to initiate the blower override and start the timing of the override, and then to exit step 70. Finally, if PCM state of charge exceeds 75%, logic flow is to Maintain ACC Control at step 88 and then to exit step 70.

SRR Compatible PCM Evaporator Charging Under Steady State Conditions

For vehicle HVAC systems with SRR, the normal operating EOAT temperature may be above the freeze temperature of the PCM for ambient temperatures in the range of 5 to 30° C. Typical EOAT temperature under SRR is around 10° C. This may make the steady state charging and maintenance of the PCM evaporator impossible due to that the melting temperature of the PCM is lower than the SRR set temperature. However, by taking advantage of the thermal inertia of the PCM evaporator and that of the airflow ducts, compatibility of SRR with PCM evaporator can be achieved.

Figure 7:
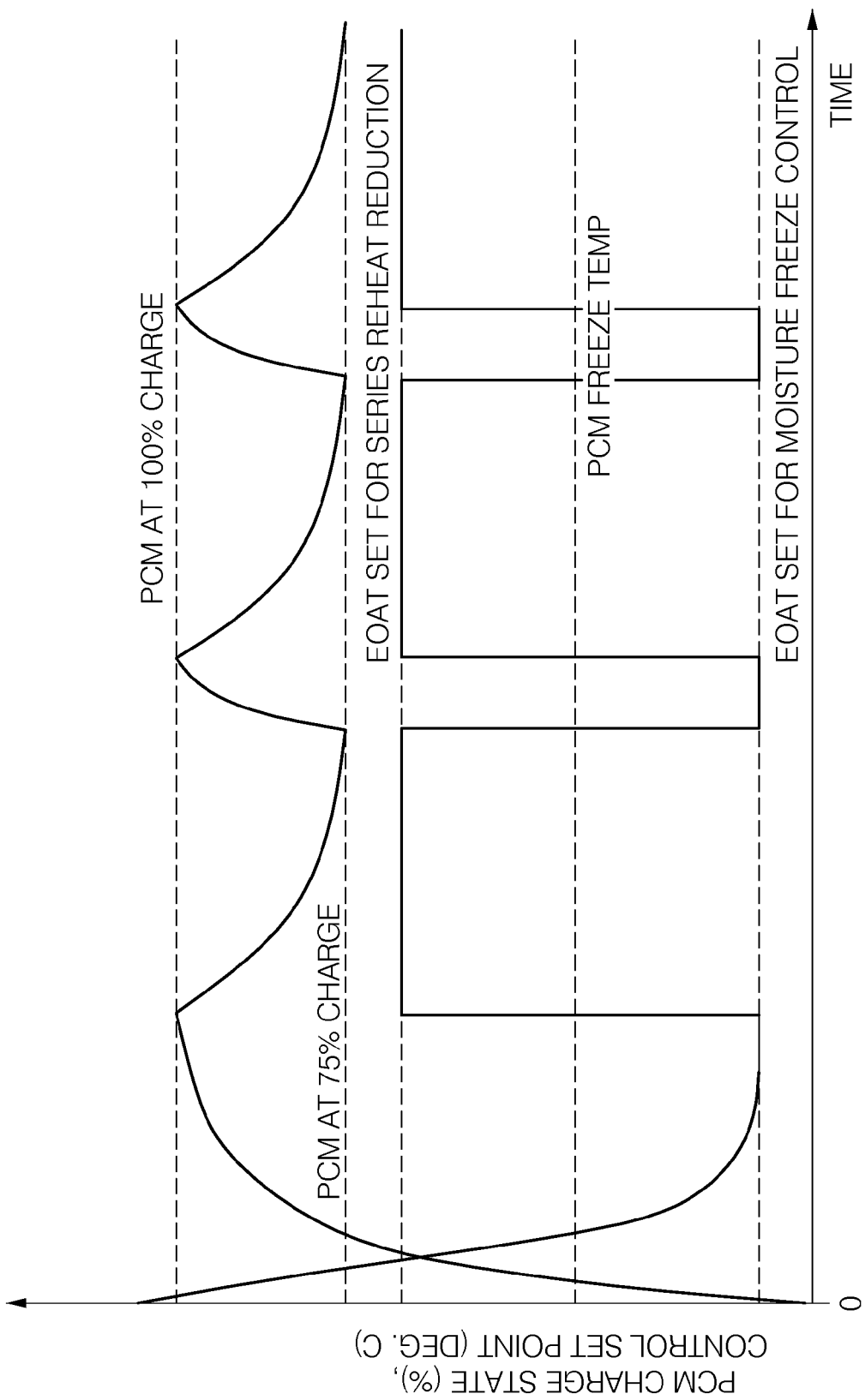
FIG. 7 is a graph illustrating PCM state of charge (%) control set point (° C.) vs. time showing the cyclic charging of a PCM evaporator during Series Reheat Reduction (SRR) operation between a state of charge of 75% and 100% in accordance with one embodiment.

As shown in FIG. 7, the initial charging of the PCM evaporator is performed by overriding the SRR control to moisture freeze control EOAT temperature. Once charged and the state of charge indicator is at 100%, the SRR control is executed to achieve improved HVAC system energy efficiency. For the maintenance of the PCM evaporator, the SRR control is periodically overridden to maintain the charging state. For example, with the SRR EOAT control at 10° C. and the PCM freeze point at 5° C., the SRR operation may slowly discharge the PCM evaporator since the refrigerant temperature maybe higher than the PCM freeze point. At a pre-established state of charge indicator level, such as 75% (defined to be the minimum required capacity level for Start Stop operation), the SRR will be overridden to evaporator freeze control for lowered refrigerant temperature to charge the PCM. For charging from a state of charge level of 75% to 100%, the estimated charging time is about 25 seconds. Due to the thermal inertia of the PCM evaporator, the air steam will likely not sense the temperature change during that period. Once the state of charge indicator reaches a value of 100%, the SRR control assumes normal control of the HVAC system. During the SRR high EOAT control period (such as 10° C.), the stored cooling in the PCM evaporator gradually gets discharged. This automatically translates into further reduced compressor load and results in additional energy saving more than that from the SRR algorithm alone. On average over the cycle, the extra energy used to charge the PCM in the SRR overriding period is balanced by the energy saving from the PCM evaporator during its discharge period. The net effect is that the state of charge is at least maintained at 75% (as an example), and the SRR still achieves its own design objective.

Figure 8:
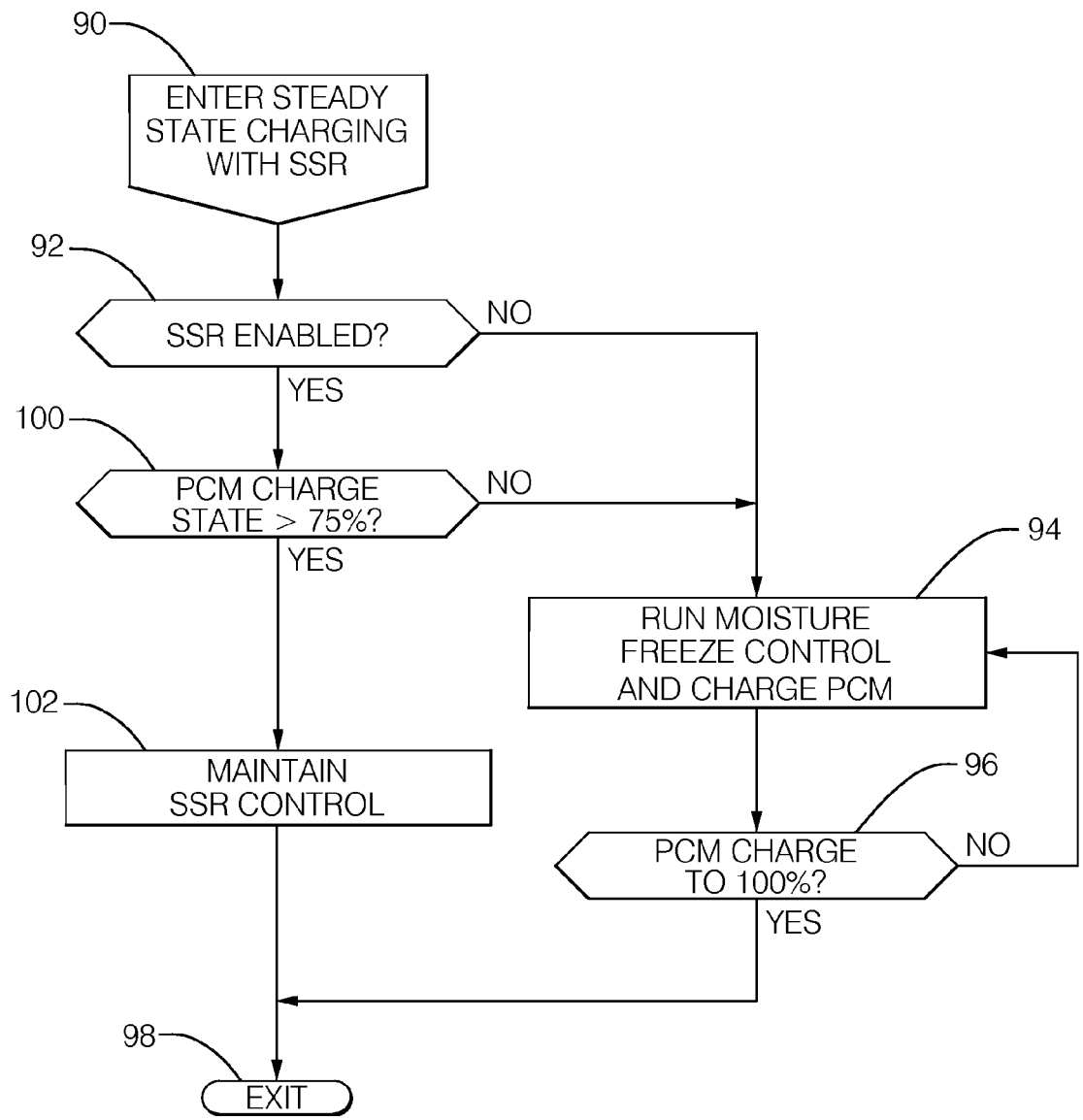
FIG. 8 illustrates a flow chart of an SRR compatible charging algorithm in accordance with one embodiment.

FIG. 8 shows the flowchart for the SRR compatible PCM charging algorithm. The flow chart commences with entering steady state charging with SRR at step 90 and flowing to logic step 92 which determines if SRR is enabled. If SRR is not enabled, logic flows to step 94 which runs moisture freeze control and charge PCM. Logic then flows to a logic step 96 which determines if PCM is charged to 100%. If the state of charge indicator is at 100%, logic flows to an exit step 98. If the state of charge indicator is less than 100%, logic feeds back to step 94 to re-run moisture freeze control and charge PCM. If the SRR is enabled at logic step 92, logic flows to a logic step 100 which determines if the state of charge exceeds 75%. If the state of charge indicator does not exceed 75%, logic flow returns to the input of step 94. If the state of charge indicator exceeds 75%, logic flow continues to step 102 which maintains SRR control and subsequently flows to exit step 98.

The SRR overriding control can be further improved by monitoring the Discharge Air Temperature (DAT) sensor for vehicles equipped with such sensors. The charging of the PCM evaporator can be carried on until the DAT sensor senses the first sign of decrease in the discharge air temperature (such as 0.5° C. decrease in discharge temperature decrease). Immediately afterwards the SRR control is resumed. The PCM state of charge indicator is monitored. When the state of charge indicator is at 75%, or some other predefined value, the charging of the PCM evaporator should be initiated again. This is carried out periodically over time. The advantage of this method is that the thermal inertia of the air ducts is utilized to perhaps allow more charging time without impacting the discharge temperature commanded by the ACC system.

Another consideration in charging the PCM evaporator is city traffic driving. A timer may be maintained between two consecutive stops and a record of the driving intervals is kept. As the frequency of the stops increases beyond certain point, a judgment is made that the vehicle is driving in the city traffic. It is expected that more energy can be saved via stopping the engine than with the SRR. At this point, PCM charging will gradually take a higher priority than SRR. This is implemented algorithmically by reducing the set point of the SRR toward evaporator moisture freeze control.

Enhanced Capacity PCM Evaporator

In comparison with an HVAC system designed to support stop-start operation, which typically requires the PCM evaporator to deliver up to 90 seconds of air discharge with an EOAT equal or lower than 15° C., a larger PCM evaporator charge capacity may be used to support a broader powertrain energy efficient operation strategy. The amount of phase change material incorporated into the PCM evaporator may be increased to provide additional cooling capacity. Such an evaporator with greater amount of PCM material than needed to support stop-start operation is hereafter referred to as an enhanced PCM evaporator. For example, if the phase change material mass to needed support stop-start operation is Mss and the additional phase change material mass is Ma, the total phase change material mass in the enhanced PCM evaporator is Mss+Ma. The utilization of the additional capacity may be managed to meet different types of traffic and road conditions as will be described below.

Charge and Discharge Control Method

Figure 9:
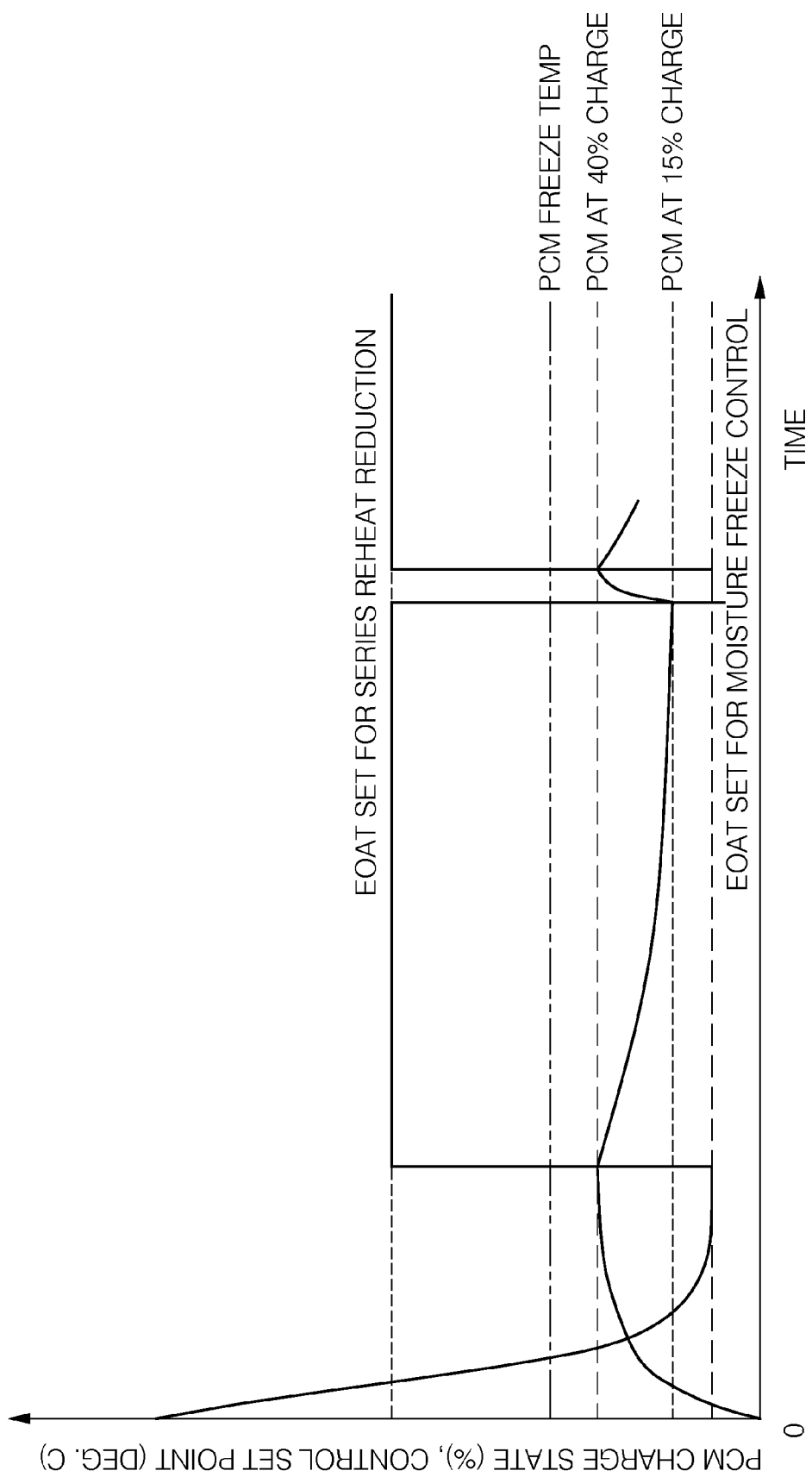
FIG. 9 is a graph illustrating PCM state of charge (%) control set point (° C.) vs. time showing the cyclic charging of a PCM evaporator between a state of charge of 55% and 40% in accordance with one embodiment.

Operation of the PCM evaporator with SRR was discussed above. In the present invention, a general method of charging and discharging control is provided to achieve arbitrary state of charge in the enhanced PCM evaporator and maintain the state of charge or discharge band accordingly. As explained earlier, FIG. 7 illustrates the PCM evaporator state of charge (SoC) being maintained between 75% and 100% by running the A/C compressor at the freeze control set point during PCM charging and running the A/C compressor at the SRR control point during PCM discharging. FIG. 9 illustrates the enhanced PCM evaporator being maintained with a SoC fluctuating between 15% and 40%. By modifying the duty cycle of the A/C compressor between the two separate control modes, i.e. freeze control and SRR energy efficiency control, the enhanced PCM evaporator can be charged and discharged in any specified SoC range. Running the A/C compressor in the freeze control state, the refrigerant temperature is below the PCM freeze temperature and able to charge the PCM evaporator up to a SoC of 100%. Running the compressor in the SRR control state, the refrigerant temperature is above the PCM freeze point, allowing the enhanced PCM evaporator to be fully discharged, e.g. to a SoC of 0%.

Improved Stop-Start Support by Enhanced PCM Evaporator

The enhanced PCM evaporator may be operated in a standard way to support stop-start operation and provide corresponding energy efficiency. In the stop-start operating mode, the amount of phase change material mass needed as a percentage is Mss/(Mss+Ma). During the charge cycle, the enhanced PCM evaporator needs to be charged to SoC value equal to Mss/(Mss+Ma). Charge and discharge of the phase change material with a mass of Mss is sufficient to provide adequate cooling for the 90% percentile of traffic stop duration. However, given the availability of the additional phase change material mass Ma, an increased level of cooling is available to support traffic stops of a longer duration. For example, when Ma=0.2 Mss the enhanced PCM evaporator may be able to provide adequate cooling for the 95% percentile of traffic stop duration. Depending on local driving conditions (e.g. outside ambient temperature), the total amount of phase change material in the enhanced PCM evaporator may be adjusted to meet the longest stop-start requirement.

A/C Compressor Braking

The enhanced PCM evaporator can be used as an energy storage device for extended road slope management to achieve increased fuel economy for the vehicle. This method is directly applicable to vehicles such as electric vehicles or hybrid electric vehicles that have regenerative braking which slows down the vehicle by converting vehicle's motion to electrical power. For vehicles with an electrically driven A/C compressor, the electrical power from the regenerative braking may be directly used to run the A/C compressor rather than be stored in a battery, and subsequently cooling is generated and stored in the enhanced PCM evaporator. Depending on the energy efficiency of charging the enhanced PCM evaporator and that of charging the electrical battery, one or the other may be used as a preferred energy storage device and the other as a secondary energy storage device. In typical internal combustion (IC) engine vehicles, the A/C compressor is driven by an accessory drive of the IC engine. In order to take advantage of A/C compressor braking, modification to the IC engine and powertrain configuration may be needed so that the A/C compressor load is transmitted to the wheels during braking, even if the engine is mechanically disconnected from the wheels, for example when the clutch or torque convertor is disengaged.

In an idealized example, a vehicle utilizing A/C compressor braking is driving on a road that has hills that undulate in a saw tooth pattern having a wavelength of 6 kilometers (km), peak to peak. In a first 3 km downhill section of the road, the vehicle would accelerate due to the effects of gravity and braking would be needed to maintain vehicle speed. Regenerative braking would be applied and the vehicle's electric motor would generate electrical power, at least a portion of which is supplied to the electrically driven A/C compressor. Meanwhile, the electrical A/C compressor is controlled to a higher duty cycle to balance the surging electrical power. Ideally, the A/C compressor loading could be used to maintain a constant road speed. At the higher duty cycle, the HVAC system generates more cooling than it is required for comfort maintenance of the vehicle cabin. The excessive cooling is absorbed by the phase change material in the PCM evaporator to achieve a higher state of charge. Assuming the 3 km downhill section provides just the right amount of cooling energy, the PCM evaporator would have increased the SoC value from the stop-start maintenance SoC value (Mss/(Mss+Ma)) to a full SoC value (100%), by the time the vehicle reaches the end of the 3 km downhill section.

After reaching the bottom of the downhill section, the vehicle starts climbing a second 3 km uphill section of the road. Additional driving power is needed to push the vehicle uphill. With the PCM evaporator at 100% state of charge, it is possible to turn off the A/C compressor, thus saving the power required to operate the A/C compressor while still maintaining the desired output temperature of the HVAC system. The power made available from the shutting down the compressor is nearly sufficient to take the vehicle to the top of the slope without losing speed. Meanwhile, the comfort of the vehicle cabin is maintained by the discharging phase change material in the PCM evaporator. Ideally, at the end of the 3 km uphill section, the PCM evaporator would have given out only the amount of cooling stored in the PCM during the 3 km downhill section, leaving the PCM evaporator with a SoC value (Mss/(Mss+Ma)) sufficient to support stop-start operation.

Of course, real world road conditions are rarely this perfectly balanced. However, the method of using the PCM evaporator as an energy storage device to modulate the load on the powertrain, to absorb or release additional power to help maintain vehicle and engine speed, which facilitate powertrain energy efficient optimization, is generally applicable. Optimal operating point for the engine and powertrain can effectively increase fuel economy of a vehicle, and prolonged time for the powertrain to operate at the optimal operating point increases the overall fuel economy of the vehicle.

Figure 10:
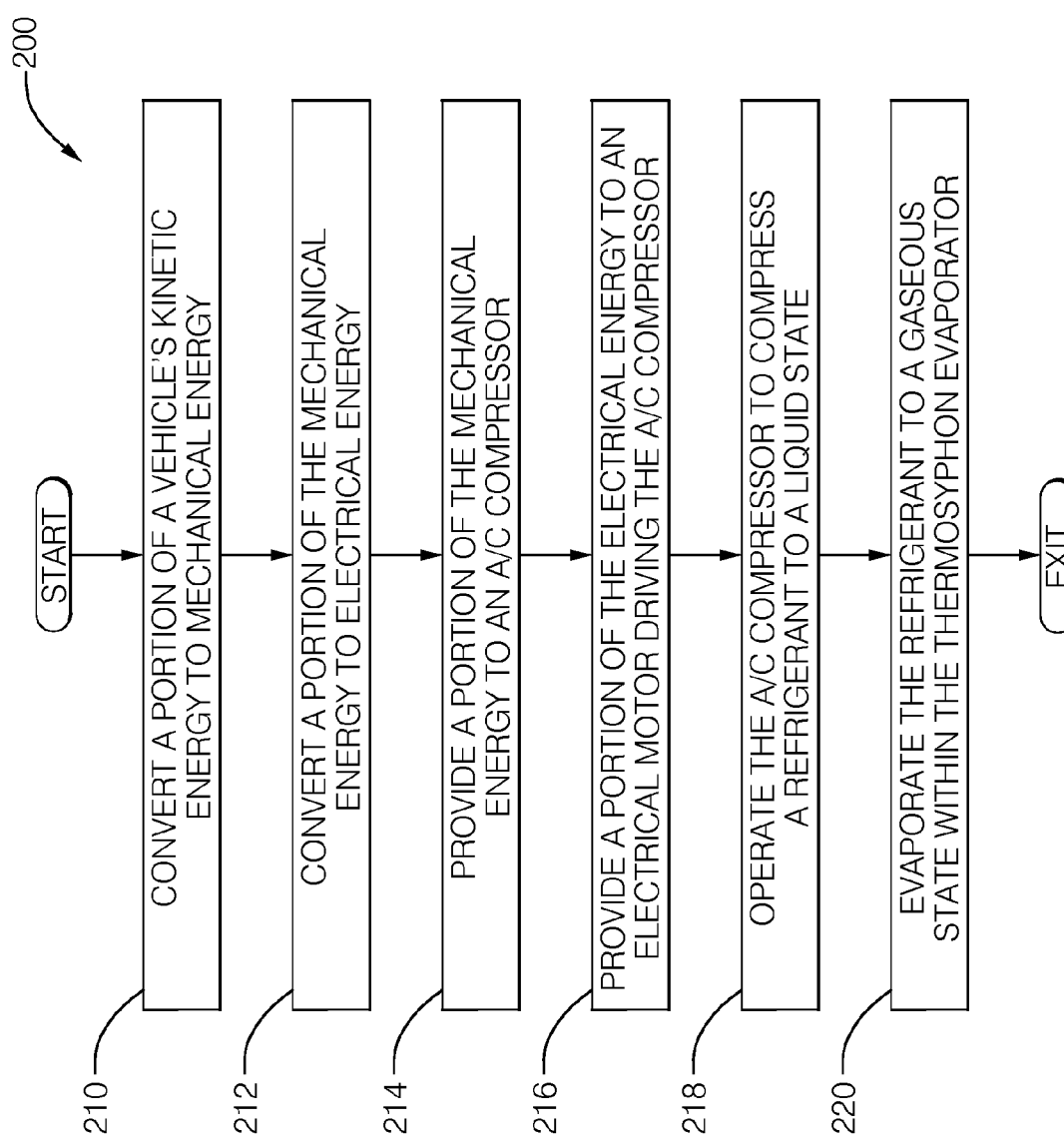
FIG. 10 illustrates a flow chart of a method for controlling an air conditioning compressor in a heating ventilation and air conditioning system having a PCM thermosiphon evaporator in accordance with one embodiment.

FIG. 10 illustrates a non-limiting example of a method 200 of recovering braking energy in a vehicle containing a HVAC system having a thermosiphon evaporator that includes a mass of phase change material.

In step 210, CONVERT A PORTION OF A VEHICLE'S KINETIC ENERGY TO MECHANICAL ENERGY, a portion of the vehicle's kinetic energy is converted to mechanical energy. This conversion may be performed by a mechanical link coupled to the traction wheels of the vehicle.

In step 212, CONVERT A PORTION OF THE MECHANICAL ENERGY TO ELECTRICAL ENERGY, a portion of the mechanical energy generated in step 210 may be transferred by the mechanical link to an electrical generator, such as an electrical motor in an electric or hybrid electric vehicle. This conversion of mechanical energy from braking to electrical energy is typically referred to as regenerative braking and the methods and systems required to practice it are well known to those skilled in the art.

In step 214, PROVIDE A PORTION OF THE MECHANICAL ENERGY TO AN A/C COMPRESSOR, a portion of the mechanical energy generated in step 210 is transferred by the mechanical link to an air conditioning compressor coupled to the mechanical link. The mechanical link may be an accessory belt drive coupled to the A/C compressor and the vehicle engine. The accessory drive may be coupled to the traction wheels via the vehicle powertrain, which includes the vehicle engine, transmission and drive shafts.

In step 216, PROVIDE A PORTION OF THE ELECTRICAL ENERGY TO AN ELECTRICAL MOTOR DRIVING THE A/C COMPRESSOR, a portion of the electrical energy generated in step 212 may be provided to an electric motor coupled to the A/C compressor to drive the A/C compressor.

In step 218, OPERATE THE A/C COMPRESSOR TO COMPRESS A REFRIGERANT TO A LIQUID STATE, the A/C compressor is driven by the accessory drive belt of step 214 or electrical motor of step 216 to compresses a refrigerant from a gaseous state to a liquid state. The refrigerant is also typically sent through a heat exchanger (condenser) prior to being supplied to an evaporator.

In step 220, EVAPORATE THE REFRIGERANT TO A GASEOUS STATE WITHIN THE THERMOSIPHON EVAPORATOR, the liquid refrigerant compressed in step 218 is sent to a thermosiphon evaporator where the refrigerant evaporates, absorbing heat from phase change material included in the thermosiphon evaporator, thereby changing a liquid state of the phase change material to a solid state and thereby storing energy from the A/C compressor.

Traffic Stop Deceleration and Acceleration Support with Enhanced PCM Evaporator

In a traffic stop, the PCM evaporator gets discharged to maintain comfort. Normally, when the vehicle takes off from the traffic light, a trade-off is made either to charge the PCM evaporator immediately by running the A/C compressor, thereby reducing vehicle acceleration performance, or to delay the PCM charging by not running the compressor so as to increase acceleration performance. When acceleration performance is optimized, passenger comfort deteriorates, and vice versa.

With the increased cooling capacity of the enhanced PCM evaporator, it can be charged to a higher state of charge than is required to support start-stop operation, e.g., SoC is equal to 1.3*Mss/(Mss+Ma) to support vehicle-take off from a traffic stop. Discharge of the enhanced PCM evaporator starts when the engine stops at the traffic light and typically requires a reduction in the SoC of Mss/(Mss+Ma). When the vehicle accelerates away from the traffic light, the remaining SoC is typically still 0.3*Mss/(Mss+Ma). Therefore, the PCM evaporator can still provide cooling during the vehicle's acceleration phase and the A/C compressor does not need to be turned on to provide cooling. There is no longer a need to compromise between vehicle acceleration performance and passenger comfort. Both can be maintained at the same time. The A/C compressor will be kept off to improve vehicle acceleration, and passenger comfort can be maintained by continued discharging of the enhanced capacity of the enhanced PCM evaporator. When the acceleration is complete, the A/C compressor may be turned on to recharge the enhanced PCM evaporator.

The additional PCM cooling charge, 0.3*Mss/(Mss+Ma) by way of example, can be provided during the vehicle deceleration. During constant speed driving, the evaporator can be charged to a state of charge level of Mss/(Mss+Ma) to support stop-start operation. When the vehicle brakes, kinetic energy from regenerative braking may be used to charge the PCM evaporator by the amount of 0.3*Mss/(Mss+Ma).

State of Charge Compressor Cycling Control

As discussed above, A/C compressor cycling is typically controlled by one of two methods. One method is designed to prevent freezing of the evaporator, commonly known as an evaporator freeze control method. Evaporator freeze control is implemented by limiting the EOAT to within a specified band, such as 1 to 3° C. The control objective is primarily to prevent the evaporator from freezing. According to this method, if low temperature air discharge is not needed, a portion of the cold air output from the evaporator is passed through the heater core to be heated up and remixed with the cold stream to get a desired discharge temperature. Running the A/C compressor to cool air down only to reheat it is obviously not energy efficient.

The other is for the reduction of series reheat, commonly known as a SRR control method. The concept behind SRR is, if a low discharge temperature is not needed, then it is not necessary to cool it down to a low temperature and subsequently only to be reheated by the heat from the heater core. In the SRR control method, the A/C compressor control set point is raised so that the EOAT temperature is around 10° C. As discussed above, the PCM evaporator may be charged to provide stop-start operation support by switching the compressor control between two modes: evaporator freeze control and SRR control.

Figure 11:
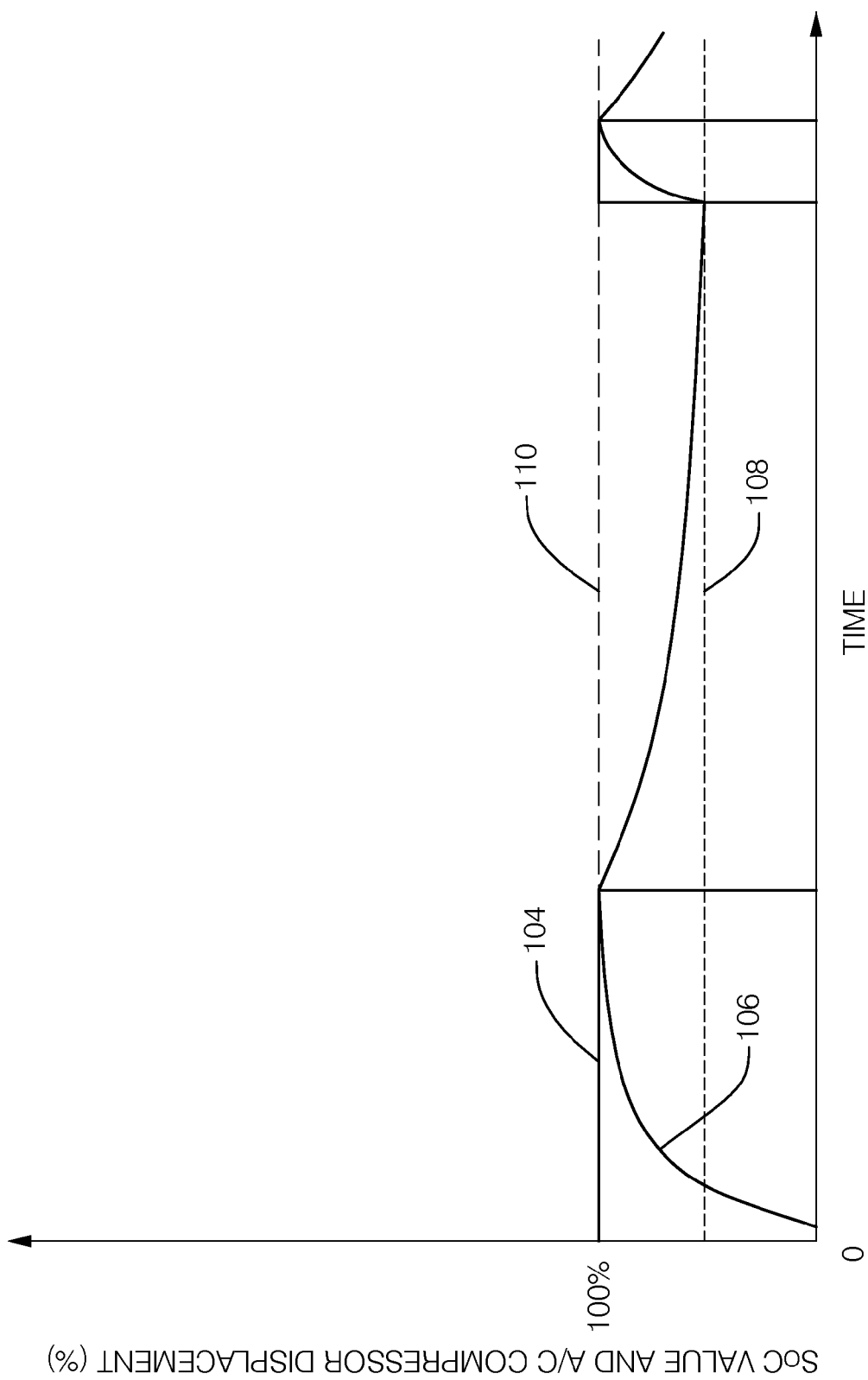
FIG. 11 is a graph illustrating the state of charge value and A/C compressor duty cycle vs. time during state of charge A/C compressor control operation in accordance with one embodiment.

Instead of A/C compressor cycling control based on freeze control methods or SRR control as discussed above, the state of charge value fp may be used directly as a compressor control parameter, hereafter referred to as the state of charge control method. As illustrated in the non-limiting example of FIG. 11, the A/C compressor duty cycle 104 may be set to maintain the state of charge value 106 within a specified range. During normal operation, the state of charge value fp may be limited between a lower limit value 108 (e.g. Mss/(Mss+Ma)) and an upper limit value 110 (e.g. 100%). Alternatively, other upper and lower limit values may be selected. During charging process, the A/C compressor is turned on to charge the enhanced PCM evaporator to the upper limit value 110. The freeze point of the phase change material is selected to ensure that the evaporator does not freeze during the period of compressor operation. Once the PCM evaporator is fully charged, the A/C compressor is switched off. The enhanced PCM evaporator starts to discharge itself to provide cooling through the HVAC system. The discharge continues until the state of charge value reaches the lower limit value 108 and the compressor will turn on again. The lower limit value 108 of Mss/(Mss+Ma) ensures that a baseline amount of cooling charge is maintained for stop-start operation. The state of charge control method allows the A/C compressor to be operated so that the SoC value 106 is within an operating band wherein the lower limit value 108 is >=0% and the upper limit value 110 is <=100%.

The benefit of this state of charge control method is that a significantly prolonged cycling period may be realized by directly using the latent heat content of the PCM evaporator. This improves energy efficiency of the HVAC system in two ways. First, it allows a variable displacement A/C compressor to operate primarily in full displacement or full stroke mode without freezing the evaporator. It is well known to those skilled in the art that full stroke operation of a variable displacement A/C compressor is more energy efficient than partial stroke operation. Alternatively, a lower cost fixed displacement A/C compressor may be used. Second, a key compressor energy loss is the transient cycling loss. The more frequently the A/C compressor cycles on and off, the lower is the energy efficiency of the A/C compressor operation. Increasing the cycling period reduces the frequency of cycling, thus giving higher A/C compressor energy efficiency.

For auto defog operation, the EOAT needs to be low to dehumidify air. The state of charge control can be overridden and switched back to evaporator freeze control when in defog mode. Other override parameters may be used to override the state of charge control method, such as a calculated or indicated humidity level for human comfort in the vehicle cabin.

Figure 12:
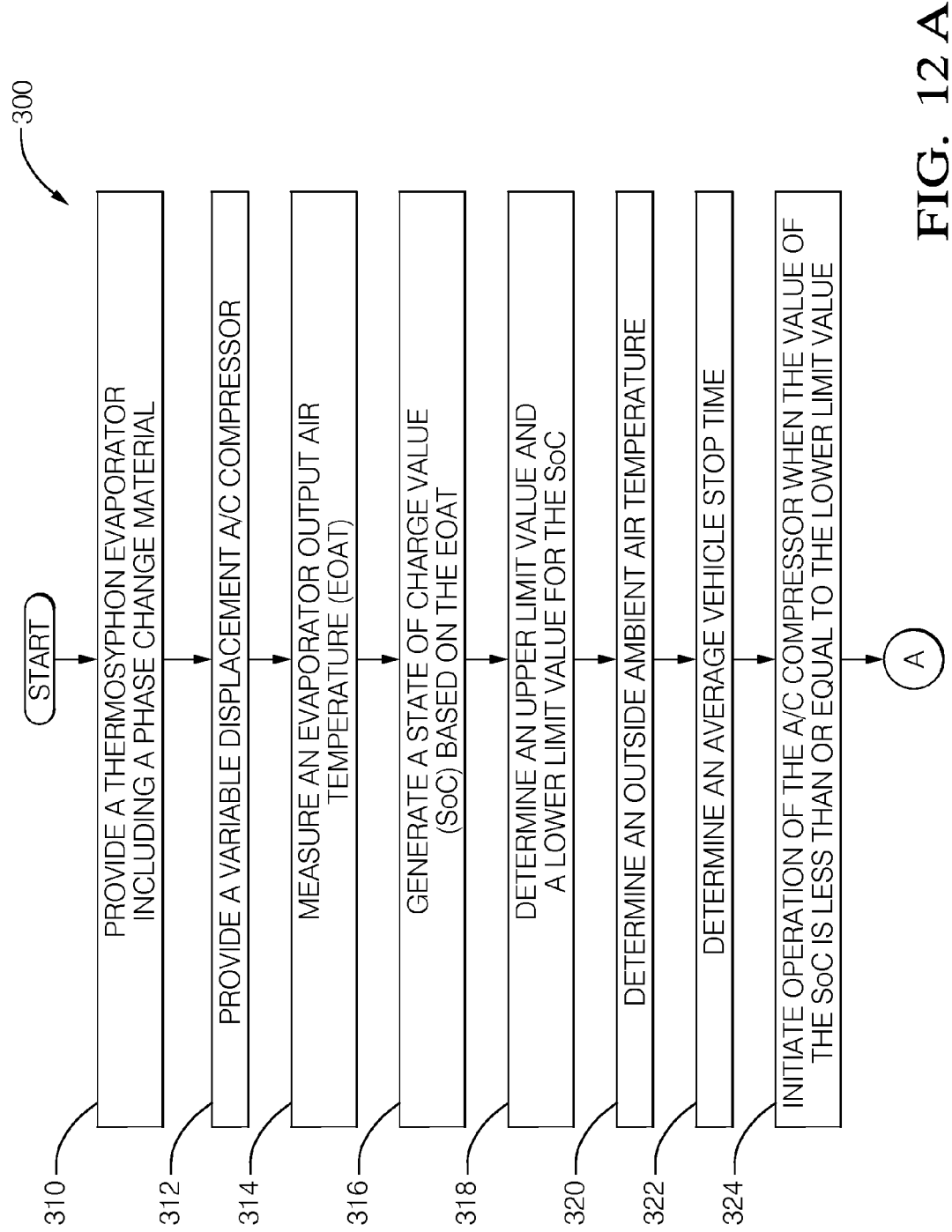
FIGS. 12A and 12B illustrate a flow chart of a method to recover braking energy in a vehicle having a HVAC system including a PCM thermosiphon evaporator in accordance with one embodiment.
Figure 12:
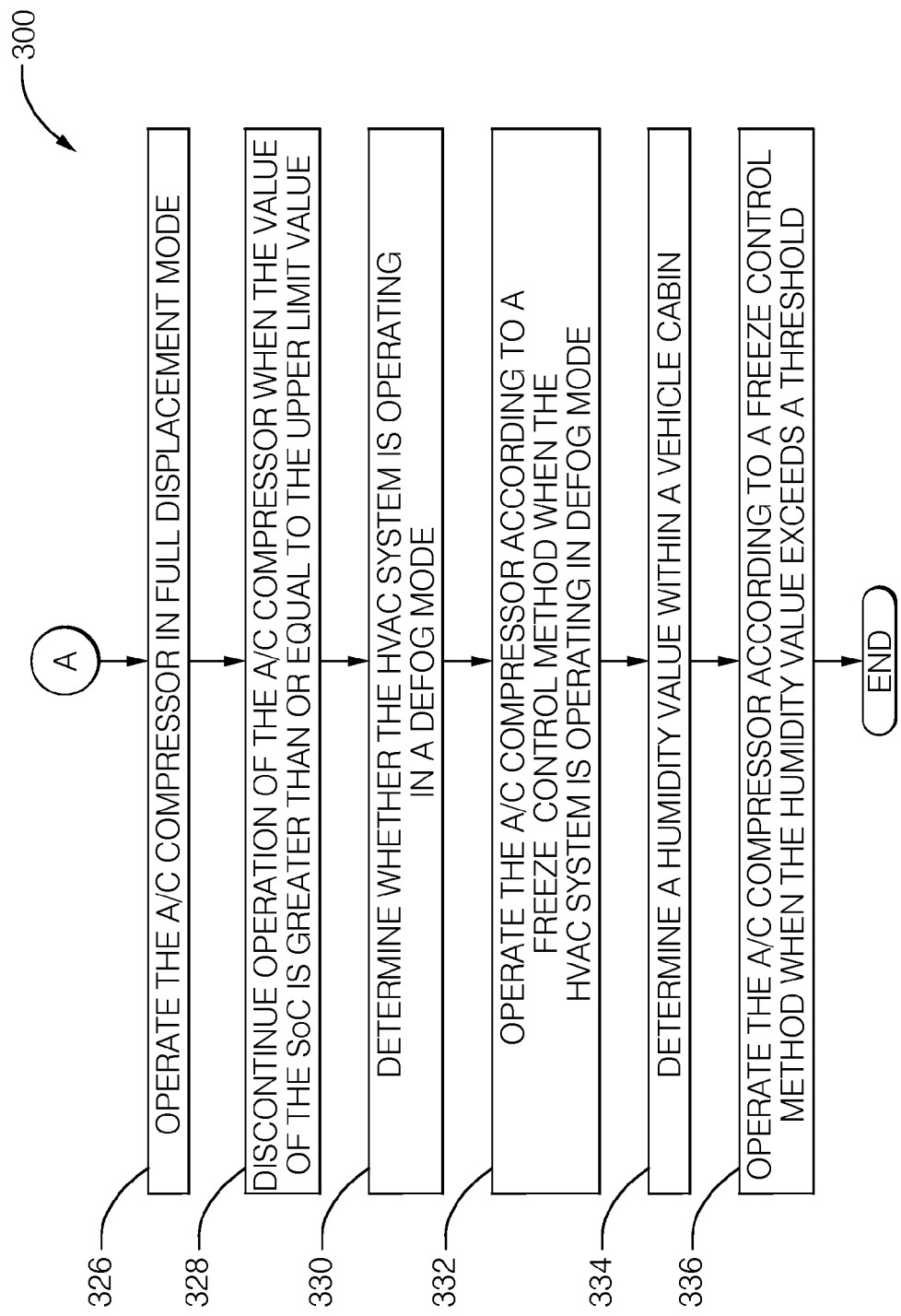

FIGS. 12A and 12B illustrate a non-limiting example of a method 300 of controlling an air conditioning (A/C) compressor in a HVAC system having a thermosiphon evaporator including a mass of phase change material.

In step 310, PROVIDE A THERMOSIPHON EVAPORATOR INCLUDING A PHASE CHANGE MATERIAL, a thermosiphon evaporator that includes a mass of phase change material is provided.

In step 312, PROVIDE A VARIABLE DISPLACEMENT A/C COMPRESSOR, a variable displacement A/C compressor may be provided. Alternatively, a fixed displacement A/C compressor may be provided.

In step 314, MEASURE AN EVAPORATOR OUTPUT AIR TEMPERATURE (EOAT), the temperature of air flowing through the evaporator is measured by a device such as a temperature sensor within the HVAC system.

In step 316, GENERATE A STATE OF CHARGE (SoC) VALUE BASED ON THE EOAT, a state of charge value fp is calculated, for example according to the equation above.

In step 318, DETERMINE AN UPPER LIMIT VALUE AND A LOWER LIMIT VALUE FOR THE SoC, an upper limit and a lower limit value for the state of charge value is determined. The lower limit may be equal to the value of Mss/(Mss+Ma) where Mss and Ma are as defined above and the upper limit value may be 1 (100%).

In step 320, DETERMINE AN OUTSIDE AMBIENT AIR TEMPERATURE, the temperature of the ambient air outside the vehicle cabin may be measured by a temperature sensor. The upper limit value of fp may be based on the outside ambient air temperature. When the outside ambient air temperature is low, the upper limit value may be reduced because less cooling of incoming ambient air by the thermosiphon evaporator is required.

In step 322, DETERMINE AN AVERAGE VEHICLE STOP TIME, an average stop time for the vehicle is determined. The lower limit value may be based on the average stop time. Shorter stop times may allow the lower limit value to be reduced while longer stop times may require the lower limit value to be increased in order to maintain vehicle cabin comfort during start-stop operation.

In step 324, INITIATE OPERATION OF THE A/C COMPRESSOR WHEN THE VALUE OF THE SoC IS LESS THAN OR EQUAL TO THE LOWER LIMIT VALUE, the A/C compressor is operated when the state of charge value is less than the lower limit in order to change the phase of the of the phase change material from liquid to solid, thereby "charging" the phase change material.

In step 326, OPERATE THE A/C COMPRESSOR IN FULL DISPLACEMENT MODE, if a variable displacement A/C compressor is provided in step 312, the A/C compressor is operated in full displacement mode, thus operating the A/C compressor in a more energy efficient mode than partial displacement mode.

In step 328, DISCONTINUE OPERATION OF THE A/C COMPRESSOR WHEN THE VALUE OF THE SoC IS GREATER THAN OR EQUAL TO THE UPPER LIMIT VALUE, the A/C compressor is shut off by disengaging the A/C compressor from the accessory belt drive or the A/C compressor enters a minimum displacement mode when the state of charge value reaches the upper limit value, signifying that the desired level of charging of the phase change material has been achieved.

In step 330, DETERMINE WHETHER THE HVAC SYSTEM IS OPERATING IN A DEFOG MODE, a HVAC system controller may determine whether the HVAC system is operating in a defog or defrost mode.

In step 332, OPERATE THE A/C COMPRESSOR ACCORDING TO A FREEZE CONTROL METHOD WHEN THE HVAC SYSTEM IS OPERATING IN DEFOG MODE, the state of charge control method of steps 312 to 328 may be overridden if it is determined in step 330 that the HVAC system is operating in the defog mode and the A/C compressor will instead be controlled by a freeze control method as described above.

In step 334, DETERMINE A HUMIDITY VALUE WITHIN A VEHICLE CABIN, a humidity value of the air within the vehicle cabin may be determined by a humidity sensor within the vehicle cabin or another method of determining humidity well known to those skilled in the art.

In step 336, OPERATE THE A/C COMPRESSOR ACCORDING TO A FREEZE METHOD WHEN THE HUMIDITY VALUE EXCEEDS A THRESHOLD, the state of charge control method of steps 312 to 328 may be overridden if it is determined in step 334 that the humidity within the cabin exceeds a threshold for comfort of the occupants of the vehicle cabin and the A/C compressor will instead be controlled by a freeze control method as described above.

Energy Recovery During Downhill Driving or Braking

Using the A/C compressor for downhill kinetic energy recovery depends on the belt-driven compressor being part of the powertrain connected to the wheels. Similar to using engine as a brake on a downhill road, the compressor may be used as a brake while generating cooling in the A/C system. In the case of the engine brake, the transmission is shifted into low gear to achieve high engine speed and with the gasoline supply to the engine cutoff. Compression of air in the cylinder by a high speed engine provides sufficient resistance to the driving wheels to serve as a brake. In the present invention of using compressor as the brake to generate maximum cooling, we propose to operate the engine inlet and exhaust valve timing in such a way that air is continuously inducted and expelled from the cylinder with minimum resistance and with no compression. Thus the rotational energy of the wheel is transmitted to the A/C compressor with high efficiency.

To recover energy on the downhill, it is additionally proposed that full stroke or highest possible compressor stroke is used in the case of a variable displacement A/C compressor. This will maximize the cooling generated by the A/C compressor to charge the PCM evaporator. Full stroke operation may cause the evaporator to freeze up the condensate on the air side of the evaporator. Thus compressor freeze control needs to be implemented either through appropriately reducing the A/C compressor displacement, or disengaging the clutch of the A/C compressor momentarily, as is well known to those skilled in the art.

To increase the rate of charging of the phase change material in the PCM evaporator by the A/C compressor operation on the downhill, it is further proposed that in the early part of the downhill, the compressor be allowed to operate so that the evaporator refrigerant temperature is below that normally achieved for standard evaporator condensate freeze control. This is referred herein as the sub-freeze compressor control. The time period in which the sub-freeze control is allowed may be tracked by a timer and compared to a calibratable time threshold. When the time threshold is exceeded, the A/C compressor can resume normal freeze control, as described above. It is recognized that after the initial sub-freeze control period, depending on the state of charge of the PCM evaporator, sub-freeze compressor control may be periodically used to provide maintenance of the charging state of the PCM material.

Downhill detection may be achieved by comparing engine power delivery to that recorded on a level road. Power from the engine on a level road is primarily a function of vehicle speed. As the road starts tilting downhill, less power is required to maintain vehicle speed. A critical slope is reached when no power from the engine is needed to maintain the vehicle speed. A steeper downhill grade of the road will cause the vehicle to accelerate. The driver will need start to apply the brake to maintain the vehicle speed. Thus for constant vehicle speed, brake application and zero engine power delivery to the wheel combined can serve as an indication of a significant downhill grade with energy to be recovered. When such a downhill grade is detected, the brake pedal position can be translated into a compressor load by way of A/C compressor control and engine inlet and exhaust valve timing and duration should be adjusted to provide minimum engine resistance.

Figure 13:
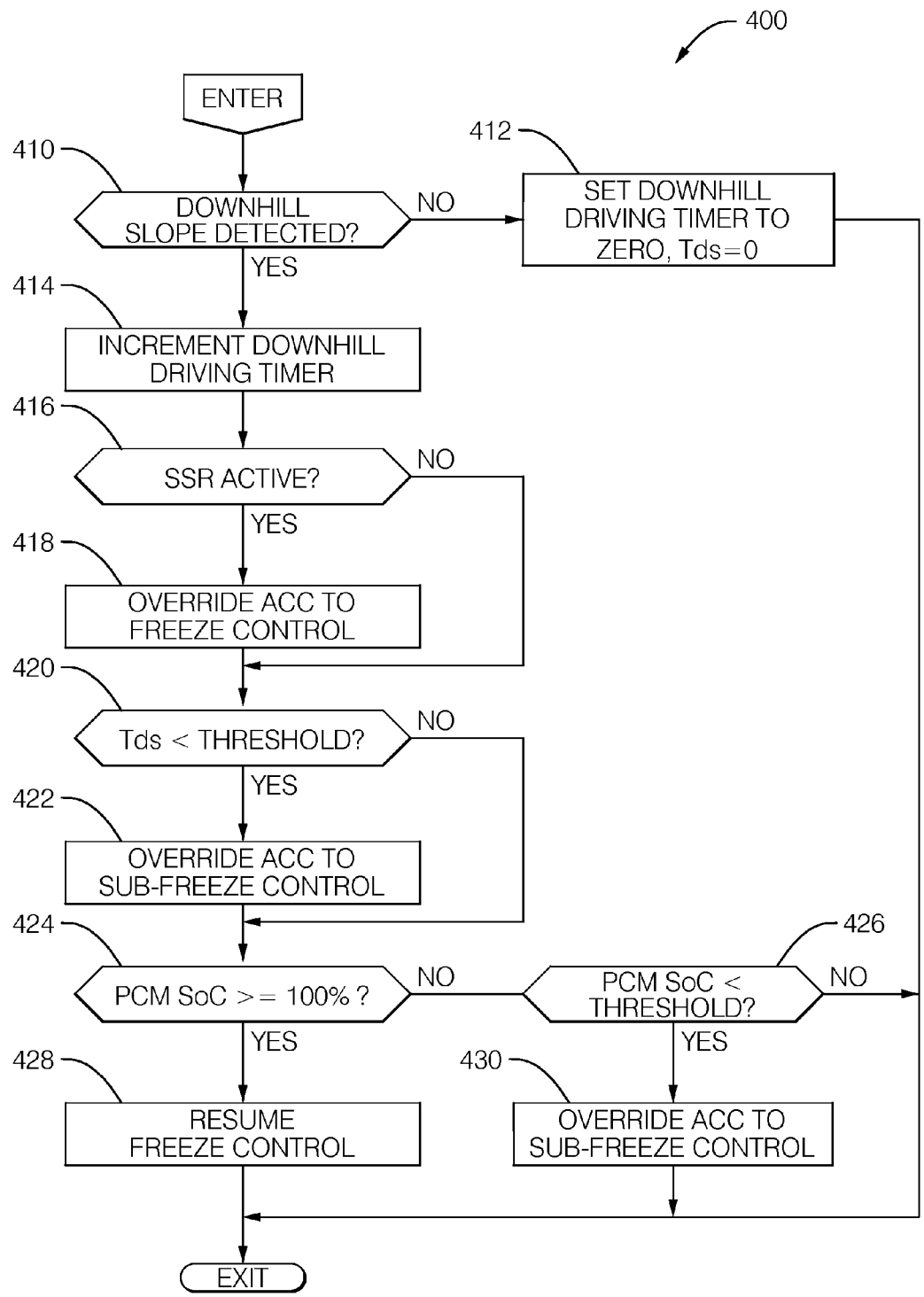
FIG. 13 illustrates a flow chart of a method for operating the A/C compressor for charging of the PCM evaporator of FIG. 1 during vehicle downhill driving in accordance with one embodiment.

FIG. 13 illustrates a non-limiting example of method 300 for controlling the compressor to charge the PCM evaporator when the vehicle is driving downhill with energy to recover.

A similar algorithm may be used when a vehicle decelerates for a traffic stop. Traffic stop braking is detected by zero engine power delivery to the wheel, vehicle speed reduction and application of brake pedal. The brake pedal position may be translated into a compressor load by controlling the A/C compressor by increasing the A/C compressor displacement, or engaging the clutch of the A/C compressor momentarily.

Application of PCM Stored Energy to Assist Hill Climbing or Acceleration from a Stop The energy stored in the PCM evaporator on a downhill road or during braking may be used to reduce the demand for engine torque from the A/C compressor, thus placing the engine in a more energy efficient operating point in the engine's RPM-torque map, and achieving improved fuel economy.

Uphill driving may be detected by comparing level road vehicle operation power/torque demand with the current power/torque demand. Under uniform vehicle speed, higher torque and engine speed can serve as an indication that the vehicle is traveling uphill. Another increased power/torque demand occurs when vehicle accelerates from a stop. For either scenario, energy stored by the PCM evaporator helps promote fuel economy by improving the engine operating point on the RPM-torque map per engine efficiency.

During acceleration away from traffic stop, or during a time period, e.g. 30 seconds, of uphill driving, it is likely that there is sufficient cooling energy stored in the PCM to provide adequate cooling for the vehicle cabin. Thus the A/C compressor can be decoupled from the engine or displacement can be minimized to reduce the compressor load on engine. In fact, for a low acceleration rate or low grade uphill slope, the compressor may remain engaged with minimal load to prolong the use of the energy stored in the PCM. After the end of the defined initial period, either because the demand for load reduction disappears, such is the case when accelerating from a stop, or the uphill slope proves to be a long one lasting longer than a time period, e.g. 30 seconds, the compressor load reduction enters the second stage, whereby the A/C compressor will operate according to standard SRR control. Under standard SRR control, the A/C compressor begins to work at low load level, and the PCM continues to discharge. The engine will perceive reduced load, but not zero load as in the initial period. This can continue for an indefinite period until the PCM is nearly exhausted, as indicated by SoC reaching a lower threshold of calibratable amount of 10%. By this time, either the road hopefully will have leveled off or the vehicle will have accelerated to a desired speed. Otherwise there may no choice but to recharge the PCM to a minimum amount to prepare for stop and go operation. The A/C compressor control reverts to PCM compatible SRR control as defined above.

Figure 14:
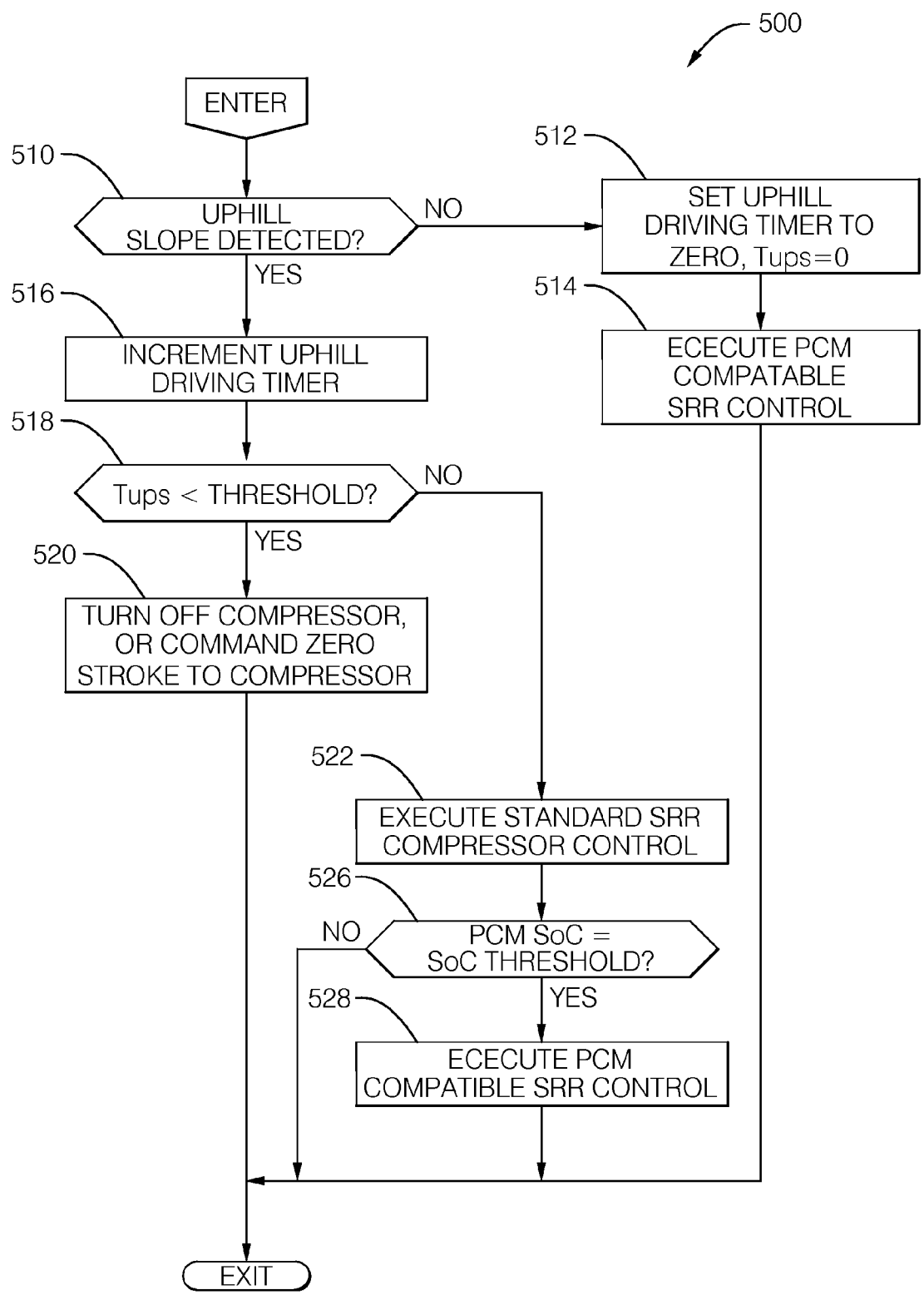
FIG. 14 illustrates a flow chart of a method for operating the A/C compressor for discharging of the PCM evaporator of FIG. 1 during vehicle uphill driving in accordance with one embodiment.

FIG. 14 illustrates a method 400 of controlling the compressor to charge the PCM evaporator when the vehicle is driving uphill.

Accordingly, a method of recovering braking energy in a vehicle containing a heating ventilation and air conditioning system having the thermosiphon evaporator including the phase change material and a method of controlling an air conditioning compressor in a heating ventilation and air conditioning system having a thermosiphon evaporator including a phase change material is provided. The method 200 uses a thermosiphon evaporator with phase change material to store some of the energy received during vehicle braking. The method 300 controls an A/C compressor used with a thermosiphon evaporator by monitoring the state of charge value fp. This method provides the benefits of improving energy by allowing a variable displacement A/C compressor to operate primarily in the more energy efficient full displacement mode without freezing the evaporator and reducing the amount of A/C compressor cycling. The method 400 controls an A/C compressor used with a thermosiphon evaporator to recover energy from decelerating the vehicle during stopping or maintaining speed on a downhill. The method 500 controls an A/C compressor used with a thermosiphon evaporator to decrease the engine load during uphill driving or accelerating from a stop.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A method of controlling an air conditioning (A/C) compressor in a heating ventilation and air conditioning (HVAC) system having an evaporator including a phase change material, the method comprising the steps of:
measuring an evaporator output air temperature (EOAT);
determining a state of charge (SoC) value based on the EOAT;
determining an upper limit value and a lower limit value for the SoC;
initiating operation of the A/C compressor when the SoC value is less than or equal to the lower limit value; and
discontinuing operation of the A/C compressor when the SoC value is greater than or equal to the upper limit value.

2. The method according to claim 1, further comprising the steps of:
determining whether the HVAC system is operating in a defog mode; and
operating the A/C compressor according to a freeze control method when the HVAC system is operating in the defog mode.

3. The method according to claim 1, further comprising the steps of:
determining a humidity value within a vehicle cabin; and
operating the A/C compressor according to a freeze method when the humidity value exceeds a threshold.

4. The method according to claim 1, further comprising the step of:
determining an outside ambient air temperature, wherein the upper limit value is based on the outside ambient air temperature.

5. The method according to claim 1, further comprising the step of:
determining an average vehicle stop time, wherein the lower limit value is based on the average vehicle stop time.

6. The method according to claim 1, further comprising the step of:
providing the evaporator that includes the phase change material.

7. The method according to claim 1, further comprising the steps of:
providing a variable displacement A/C compressor; and
operating the A/C compressor in full displacement mode.

8. The method according to claim 1, wherein a mass of phase change material in the evaporator is Mss+Ma, where Mss is a phase change material mass required for start-stop operation and Ma is an additional phase change material mass and wherein the lower limit value is Mss/(Mss+Ma).

9. The method according to claim 1, wherein the step of determining the state of charge (SoC) value further includes the steps of:
determining the SoC value by calculating a difference between an estimated refrigerant temperature based on the EOAT and a phase change material freeze temperature and integrating the difference over time; and
applying a calibratable factor to the SoC value so that the SoC value indicates a percentage of phase change material charged.

10. The method according to claim 9, further comprising the steps of:
initializing the SoC value to zero after a prolonged calibratable period of HVAC system off time; and
truncating the value of the SoC value to 1 (100%) when the SoC value is greater than 1 (100%).

11. A method of recovering braking energy in a vehicle having a HVAC system having the evaporator including the phase change material, the method comprising the steps of:
converting a portion of the vehicle's kinetic energy to mechanical energy;

providing a portion of the mechanical energy to an A/C compressor;

operating the A/C compressor to compress a refrigerant to a liquid state;

evaporating the refrigerant to a gaseous state within the evaporator, thereby changing a liquid state of the phase change material to a solid state and thereby storing energy from the A/C compressor, wherein the A/C compressor is controlled by the method of claim 1.

12. The method according to claim 11, further comprising the steps of:

converting a portion of the mechanical energy to electrical energy; and providing a portion of the electrical energy to an electrical motor driving the A/C compressor.

13. A method of recovering braking energy in a vehicle having a HVAC system having an evaporator including a phase change material, the vehicle having a kinetic energy, the method comprising the steps of:

converting a portion of the vehicle's kinetic energy to mechanical energy;

providing a portion of the mechanical energy to an A/C compressor;

operating the A/C compressor to compress a refrigerant to a liquid state;

evaporating the refrigerant to a gaseous state within the evaporator, thereby changing a liquid state of the phase change material to a solid state and thereby storing energy from the A/C compressor.

14. The method according to claim 13, further comprising the steps of:

converting a portion of the mechanical energy to electrical energy; and providing a portion of the electrical energy to an electrical motor driving the A/C compressor.

15. The method according to claim 13, further comprising the steps of:

detecting whether the vehicle is driving downhill;

determining a downhill driving time period;

operating the A/C compressor according to sub-freeze control when the downhill driving time is within the downhill driving time period; and operating the A/C compressor according to standard freeze control when the downhill driving time period is exceeded.

16. The method according to claim 13, further comprising the steps of:

detecting whether the vehicle is decelerating;

determining a deceleration time period; and operating the A/C compressor according to sub-freeze control when the deceleration time is within the deceleration time period; and operating the A/C compressor according to standard freeze control when the deceleration time period is exceeded.

17. A method of controlling an A/C compressor in a HVAC system having an evaporator including a phase change material, the method comprising the steps of:

determining an increased engine load;

determining an increased engine load time period; and discontinuing operation of the A/C compressor until the increased engine load time period exceeds a threshold; and operating the A/C compressor according to a Series Reheat Reduction (SRR) method when the increased engine load time period exceeds the threshold.

18. The method according to claim 17, further comprising the steps of:

detecting whether the vehicle is driving uphill;

determining an uphill driving time period;

operating the A/C compressor according to the SRR method control when the downhill driving time is within the downhill driving time period; and operating the A/C compressor according to standard freeze control when the PCM charge is below a SoC threshold.

19. The method according to claim 17, further comprising the steps of:

detecting whether the vehicle is accelerating;

determining an acceleration time period; and operating the A/C compressor according to the SRR method when the acceleration time exceeds the acceleration time period; and operating the A/C compressor according to standard freeze control when the PCM charge is near a low threshold.

* * * * *